United States Patent
Brannan et al.

(10) Patent No.: US 12,187,289 B1
(45) Date of Patent: Jan. 7, 2025

(54) SYSTEMS AND METHODS FOR GENERATING REFINED RISK MODELS RESPONSIVE TO VEHICLE-BASED TELEMATICS DATA

(71) Applicant: State Farm Mutual Automobile Insurance Company, Bloomington, IL (US)

(72) Inventors: Joseph Robert Brannan, Bloomington, IL (US); Brian N. Harvey, Bloomington, IL (US); Darwin Gene Beachy, Hopedale, IL (US); Matthew Eric Riley, Sr., Heyworth, IL (US); Benjamin Joel Tucker, Le Roy, IL (US); Michael Aaron Myers, Heyworth, IL (US); Ryan Michael Gross, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 390 days.

(21) Appl. No.: 17/191,400

(22) Filed: Mar. 3, 2021

Related U.S. Application Data

(60) Provisional application No. 63/059,733, filed on Jul. 31, 2020, provisional application No. 63/006,263, filed on Apr. 7, 2020.

(51) Int. Cl.
*B60W 40/09* (2012.01)
*B60W 30/08* (2012.01)
(Continued)

(52) U.S. Cl.
CPC ............ *B60W 40/09* (2013.01); *B60W 30/08* (2013.01); *G06N 20/00* (2019.01); *G06V 20/56* (2022.01); *H04W 4/021* (2013.01); *H04W 4/40* (2018.02)

(58) Field of Classification Search
None
See application file for complete search history.

(56) References Cited

U.S. PATENT DOCUMENTS

| 8,467,807 B1 | 6/2013 | Dalit et al. |
| 8,892,451 B2 | 11/2014 | Everett et al. |
| (Continued) | | |

FOREIGN PATENT DOCUMENTS

| EP | 3239686 A1 | 11/2017 |
| EP | 3578433 B1 | 8/2020 |
| (Continued) | | |

OTHER PUBLICATIONS

Ermolieva, T., Filatova, T., Ermoliev, Y., Obersteiner, M., Bruijn, K. M., Jeuken, A. (2017). Flood catastrophe model for designing optimal flood insurance program: Estimating location-specific premiums in the netherlands. Risk Analysis, 37(1), 82-98. doi:http://dx.doi.org/10.1111/risa.12589 on Jan. 20, 2023 (Year: 2017).

(Continued)

*Primary Examiner* — Peter D Nolan
*Assistant Examiner* — Jacob Kent Besteman-Street
(74) *Attorney, Agent, or Firm* — Armstrong Teasdale LLP

(57) ABSTRACT

A data analytics computing device for generating refined risk models responsive to vehicle-based telematics data is configured to receive geolocation data and telematics data associated with a plurality of vehicles. The geolocation data is captured at a location sensor of a vehicle computing device and representative of a location of the vehicle, and the telematics data is captured at a plurality of sensors of at least one of the vehicle or the vehicle computing device and representative of movement of the vehicle. The plurality of vehicles is associated with a geographic area. The data analytics computing device is also configured to apply machine-learning techniques to the geolocation data and the (Continued)

telematics data to define standard driving behavior within the geographic area, and generate driving behavior risk models for the geographic area based upon the standard driving behavior.

17 Claims, 7 Drawing Sheets

(51) Int. Cl.
  *G06N 20/00* (2019.01)
  *G06V 20/56* (2022.01)
  *H04W 4/021* (2018.01)
  *H04W 4/40* (2018.01)

(56) References Cited

U.S. PATENT DOCUMENTS

| | | | |
|---|---|---|---|
| 8,909,248 B2 | 12/2014 | Phillips et al. | |
| 9,311,271 B2 | 4/2016 | Wright | |
| 9,633,487 B2 | 4/2017 | Wright | |
| 9,830,748 B2 | 11/2017 | Rosenbaum | |
| 9,990,782 B2 | 6/2018 | Rosenbaum | |
| 10,019,904 B1* | 7/2018 | Chan | G06Q 10/0635 |
| 10,192,369 B2 | 1/2019 | Wright | |
| 10,198,879 B2 | 2/2019 | Wright | |
| 10,217,169 B2 | 2/2019 | Schumann, Jr. | |
| 10,223,744 B2 | 3/2019 | Brady et al. | |
| 10,269,190 B2 | 4/2019 | Rosenbaum | |
| 10,295,356 B1 | 5/2019 | Cope | |
| 10,430,883 B1 | 10/2019 | Bischoff | |
| 10,467,824 B2 | 11/2019 | Rosenbaum | |
| 10,490,078 B1* | 11/2019 | Fields | G08G 1/096838 |
| 10,493,994 B1 | 12/2019 | Fields | |
| 10,540,723 B1 | 1/2020 | Potter et al. | |
| 10,582,354 B1 | 3/2020 | Isaac | |
| 10,586,288 B2 | 3/2020 | Biemer | |
| 10,633,001 B2 | 4/2020 | Ferguson et al. | |
| 10,672,078 B1 | 6/2020 | Diesse | |
| 10,916,075 B1 | 2/2021 | Webster | |
| 11,042,938 B1 | 6/2021 | Robare | |
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 2003/0100993 A1 | 5/2003 | Kirshenbaum | |
| 2004/0039661 A1 | 2/2004 | Fuzell-Casey | |
| 2011/0161116 A1* | 6/2011 | Peak | G01C 21/36 345/173 |
| 2013/0222133 A1 | 8/2013 | Schultz et al. | |
| 2014/0108058 A1 | 4/2014 | Bourne et al. | |
| 2014/0278837 A1 | 9/2014 | Blumer et al. | |
| 2014/0365246 A1* | 12/2014 | Hayward | G06Q 40/08 705/4 |
| 2015/0142313 A1* | 5/2015 | Haberman | G01C 21/3415 701/533 |
| 2015/0163626 A1* | 6/2015 | Zimmer | H04W 4/029 455/404.2 |
| 2015/0213518 A1 | 7/2015 | Krishnamurthy et al. | |
| 2016/0171521 A1* | 6/2016 | Ramirez | G08G 1/096838 701/409 |
| 2016/0223348 A1* | 8/2016 | Witte | G01C 21/3492 |
| 2017/0365169 A1* | 12/2017 | Tennent | G06Q 10/06 |
| 2018/0080777 A1* | 3/2018 | Nimchuk | G01C 21/3415 |
| 2018/0330318 A1 | 11/2018 | Alaparthy | |
| 2019/0005812 A1 | 1/2019 | Matus et al. | |
| 2019/0147538 A1 | 5/2019 | Duan et al. | |
| 2019/0375416 A1 | 12/2019 | Rau | |
| 2020/0074326 A1* | 3/2020 | Balakrishnan | G06F 16/583 |
| 2020/0086882 A1* | 3/2020 | Kodali | B60W 60/007 |
| 2021/0133886 A1 | 5/2021 | Williams | |
| 2021/0264536 A1 | 8/2021 | Dahl | |
| 2021/0295443 A1* | 9/2021 | Webster | H04W 4/029 |
| 2022/0092893 A1 | 3/2022 | Rosenbaum | |
| 2022/0340148 A1 | 10/2022 | Rosenbaum | |
| 2023/0060300 A1 | 3/2023 | Rosenbaum | |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

OTHER PUBLICATIONS

Pitney bowes Mapinfo: Pitney bowes Mapinfo aligns with exclusive analysis to provide advanced terrorism risk analytics; TerrorRisk (tm) enables insurers to conduct enhanced strategic planning through location-specific terrorism risk exposure. (2007, Sep. 10). M2 Presswire Retrieved from https://dialog.proquest.com/professional/docview/444633140accountid= 131444 (Year: 2007).

* cited by examiner

SYSTEMS AND METHODS FOR GENERATING REFINED RISK MODELS RESPONSIVE TO VEHICLE-BASED TELEMATICS DATA

CROSS-REFERENCE TO RELATED APPLICATIONS

This application claims the benefit of priority to U.S. Provisional Patent Application No. 63/006,263, filed Apr. 7, 2020, entitled "SYSTEMS AND METHODS FOR GENERATING REFINED RISK MODELS RESPONSIVE TO VEHICLE-BASED TELEMATICS DATA", and to U.S. Provisional Patent Application No. 63/059,733, filed Jul. 31, 2020, entitled "SYSTEMS AND METHODS FOR GENERATING REFINED RISK MODELS RESPONSIVE TO VEHICLE-BASED TELEMATICS DATA", the entire contents and disclosure of which are hereby incorporated by reference herein.

FIELD OF THE DISCLOSURE

The present disclosure generally relates to analyzing telematics data, and, more particularly, to systems and methods for generating refined risk models responsive to vehicle-based telematics data.

BACKGROUND

Connected vehicles are vehicles equipped with communications abilities (e.g., vehicle-to-infrastructure (V2I), vehicle-to-vehicle (V2V), and/or vehicle-to-network (V2N) communication). Such vehicles are increasingly common. Connected vehicles are often equipped with a variety of sensors that are potential sources of data (e.g., telematics data) regarding drivers of the connected vehicle and trips taken by the connected vehicle, and/or an environment around the connected vehicle. Likewise, individuals use mobile devices (e.g., mobile telephones) for a variety of purposes and often carry mobile devices while traveling. Such usage may be an additional source of data. For example, mobile devices may be equipped to generate data (e.g., telematics data) using instruments built into the mobile device, such as an accelerometer or global positioning system (GPS) device.

This data obtained from connected cars and/or mobile devices may be useful for a variety of applications. However, there are currently limitations in the ability of computing devices to utilize such data in automated processes. Specifically, telematics data may need to be reconciled by human beings to be used in various applications, which may result in lack of timeliness, inaccuracies, inconvenience, and/or other drawbacks.

BRIEF SUMMARY

The present embodiments may relate to, inter alia, systems and methods for generating refined risk models responsive to vehicle-based telematics data. Based upon the telematics data received from a user, the systems described herein may develop a profile of standard driving behavior within one or more geographic areas (using, in some embodiments, artificial-intelligence and/or machine-learning techniques). The standard driving behavior accounts for location-dependent variation in driving behavior, as standardized across a plurality of vehicles within the geographic area. Such profiling may incorporate additional data, such as vehicle characteristics and environmental data. Moreover, the systems described herein may leverage the standard driving behavior to develop refined, highly precise risk models for drivers within the geographic area. The risk models may also be location-dependent and, in some embodiments, dynamically incorporate real-time driving behavior. These refined risk models may be leveraged to improve insurance coverage, and reduce overall driving risk within the geographic area.

In one aspect, a data analytics computing device for generating refined risk models responsive to vehicle-based telematics data may be provided. The data analytics computing device may include at least one processor and/or an associated transceiver in communication with a memory device. The at least one processor and/or associated transceiver may be programmed to: (i) receive geolocation data and telematics data associated with a plurality of vehicles, wherein the geolocation data may be captured at a location sensor of a vehicle computing device and representative of a location of the vehicle, and the telematics data may be captured at a plurality of sensors of at least one of the vehicle or the vehicle computing device and representative of movement of the vehicle, the plurality of vehicles associated with a geographic area, (ii) apply machine-learning techniques to the geolocation data and the telematics data to define standard driving behavior within the geographic area, and/or (iii) generate driving behavior risk models for the geographic area based upon the standard driving behavior. The data analytics computing device may include less, additional, and/or alternative functionality, including that described herein.

In another aspect, a computer-implemented method for generating refined risk models responsive to vehicle-based telematics data may be provided. The method may include, via a data analytics computing device comprising at least one processor in communication with a memory device: (1) receiving geolocation data and telematics data associated with a plurality of vehicles, the geolocation data captured at a location sensor of a vehicle computing device and representative of a location of the vehicle, the telematics data captured at a plurality of sensors of at least one of the vehicle or the vehicle computing device and representative of movement of the vehicle, the plurality of vehicles associated with a geographic area; (2) applying machine-learning techniques to the geolocation data and the telematics data to define standard driving behavior within the geographic area; and/or (3) generating driving behavior risk models for the geographic area based upon the standard driving behavior. The method may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. In addition, although certain steps of the exemplary processes are numbered, having such numbering does not indicate or imply that the steps necessarily have to be performed in the order listed. The steps may be performed in the order indicated or in another order. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
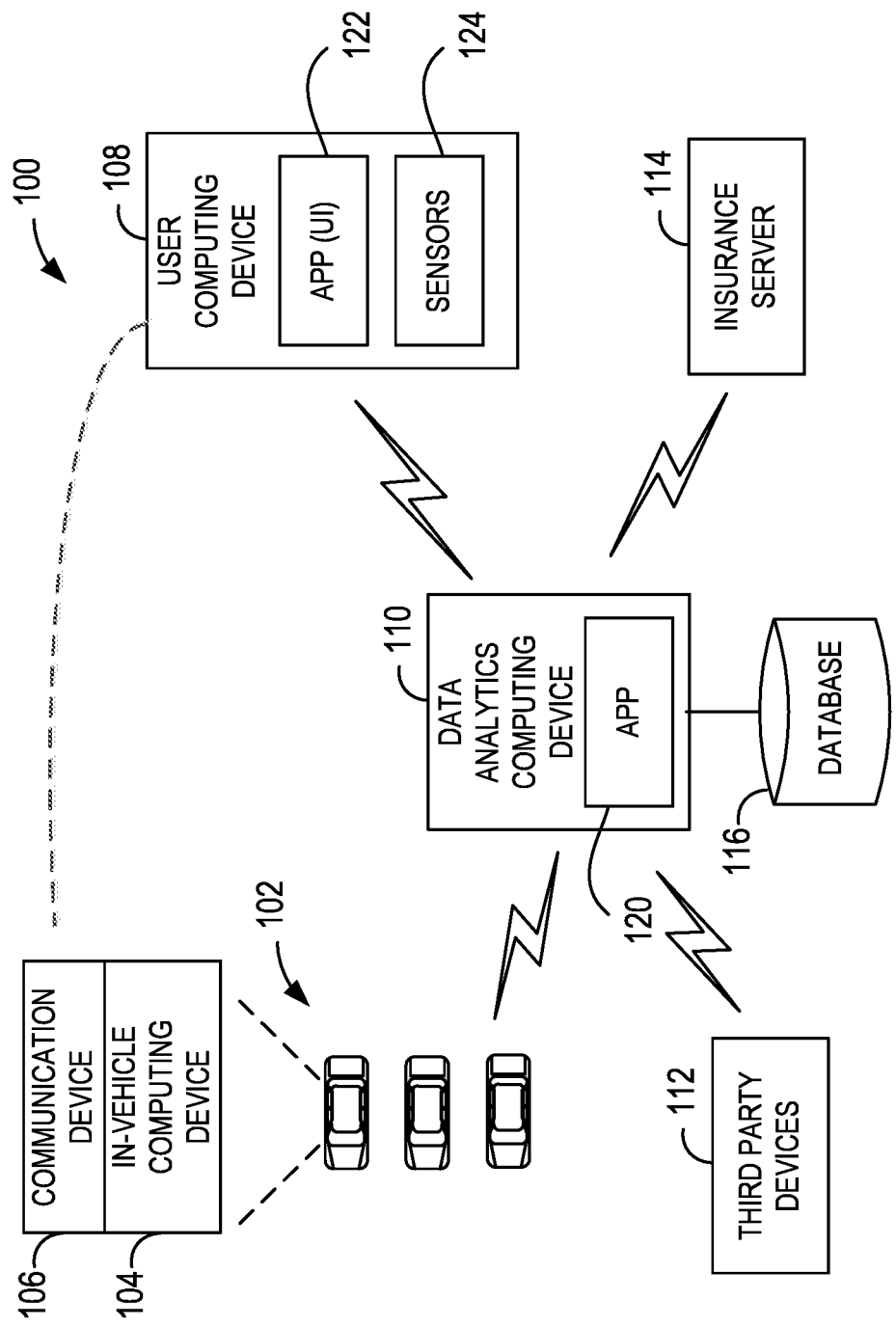
FIG. 1 illustrates a schematic diagram of an exemplary computer system including a data analytics computing device in accordance with the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for generating refined risk models responsive to vehicle-based telematics data. In particular, a computer system may include a data analytics computing device configured to receive, process, and synthesize (e.g., using artificial-intelligence and/or machine-learning techniques) vehicle-related telematics data to define (e.g., generate a profile of) standard driving behavior within a geographic area. The data analytics computing device may receive telematics data (and/or other data, such as geolocation data) from a vehicle and/or a user device (e.g., a mobile telephone, a vehicle-based computing device, etc.). The data analytics computing device may additionally use environmental data, vehicle characteristics, image data, and/or any other suitable data to further define, modify, or update the standard driving behavior. The data analytics computing device may use the standard driving behavior to generate, modify, or update driving behavior risk models. These risk models are associated with coverage levels, costs, and other characteristics of insurance policies associated with vehicles and their drivers within the geographic area. Using the standard driving behavior, these risk models may be highly location dependent and precise, which enables coverage and cost optimization. It should be understood that in at least some embodiments, there may be manual actuarial and/or underwriting review and/or monitoring of models, policies, or recommendation generated based upon artificial intelligence, for consideration of both individual model factors and combinations of model factors.

"Vehicle," as used herein, may refer generally to any vehicle owned, operated, and/or used by one or more vehicle users. A vehicle may include any kind of vehicle, such as, for example, cars, trucks, all-terrain vehicles (ATVs), motorcycles, recreational vehicles (RVs), snowmobiles, boats, autonomous vehicles, semi-autonomous vehicles, user-driven or user-operated vehicles, industrial vehicles (e.g., construction vehicles), "riding" lawnmowers, farm equipment, planes, helicopters, bicycles, flying cars, robo-taxis, self-driving taxis, and/or any kind of land-, water-, or air-based vehicle. "Vehicle user," as used herein, may refer generally to a person who is responsible for the vehicle, and who has access to use of the vehicle. Vehicle users may include owners, lessors, and/or renters, for example, of a vehicle. Vehicle users may be personal vehicle users (e.g., may be responsible for and have access to one or more vehicles for personal use) and/or may be corporate vehicle users (e.g., corporate managers who may be responsible for and have access to one or more vehicles associated with corporate use and/or with a corporate entity).

"Autonomous vehicle," as used herein, may refer generally to any vehicle that has at least one automation system that is related to the piloting of the vehicle (e.g., warning systems assisting in a piloting task, intervention systems performing a piloting task, control systems performing a piloting task). The term "unautomated vehicle" refers to vehicles in which no automation systems are present (e.g., the vehicle is being piloted by the full-time performance of a human driver, and without enhancements from warning or intervention systems). The terms "semi-autonomous vehicle" and "autonomous vehicle" may be used interchangeably in some instances, and the term "autonomous vehicle" may be used to refer to both semi-autonomous vehicles and autonomous vehicles for purposes of convenience.

Automation systems include, for example, rear-view sensors and alarms (e.g., to detect obstacles while in reverse), anti-lock braking systems (e.g., to prevent wheel locking during deceleration), traction control systems (e.g., actuating brakes or reducing throttle to restore traction if wheels begin to spin), electronic stability control and acceleration slip regulation (e.g., to prevent the car from understeering or oversteering), dynamic steering response (e.g., to correct the rate of power steering based upon road conditions), cruise control (e.g., to maintain vehicle speed), autonomous cruise control (e.g., to adjust cruising speed to maintain safe distance from vehicles ahead), lane-keep assist systems (e.g., to alert the driver or adjust steering to keep the vehicle in its current lane), driver monitoring systems (e.g., to warn drivers when they become drowsy or fall asleep), adaptive headlamps (e.g., to alter the brightness or angle of headlamps), collision avoidance systems (e.g., to warn the driver an impending collision or adjust steering to avoid impending collision), parking assistance systems, blind spot monitoring systems, traffic sign recognition systems, dead man's switch systems, computer vision systems, location determination systems (e.g., GPS), and navigation systems (e.g., to navigate or assist in navigating the vehicle to a destination).

"App," as used herein, may refer generally to a software application installed and downloaded on a user computing device and executed to provide an interactive graphical user interface at the user computing device. An app associated with the computer system, as described herein, may be understood to be maintained by the computer system and/or one or more components thereof. Accordingly, a "maintaining party" (or device) of the app may be understood to be responsible for any functionality of the app and may be considered to instruct other parties/components to perform such functions via the app.

"Telematics data," as used herein, may refer generally to data associated with monitoring a moving computing device. Telematics data incorporates location, movement (e.g., speed, direction, acceleration, braking, cornering, swerving, deceleration, lateral movement, vertical or horizontal movement, etc.), and condition (e.g., "on", "off", in-motion, etc.) data based upon a plurality of sensors on-board the computing device and/or connected to the computing device. Accordingly, where the computing device is associated with a vehicle, the telematics data may be associated with monitoring the vehicle. Where the computing device is a personal mobile computing device, such as a smart phone, the telematics data may be associated with monitoring the personal mobile computing device. In at least some cases, the personal mobile computing device may be used to capture vehicle telematics data, where the personal mobile computing device is present in/on a vehicle during motion/use of the vehicle.

"Sensor data," as used herein, may refer generally to data captured by sensors that is not necessarily associated with the movement of a computing device. For example, sensor data for a vehicle may include geolocation data, even for a non-moving vehicle, and/or data that captures movement of occupants of the vehicle, which may not affect the motion of the vehicle. In some cases, telematics data may include sensor data, where data is sent in packets that include data from all sensors associated with a computing device (e.g., both motion and non-motion sensor data).

"Environmental data," as used herein, may refer generally to data not specific to the user but descriptive of the environment around and/or associated with the user at the time the geolocation and/or telematics data (and/or other sensor data) was captured. Environmental data may include ambient data (e.g., weather data, traffic data, market data, crime data), data associated with other computing devices or vehicles, policy data (e.g., posted speed limits, road closures, detours, etc.), cost data (e.g., gas prices, insurance policy premiums, maintenance costs, etc.), times/dates, insurance claim data, and the like. In some cases, environmental data is accessed from one or more third-party sources. Additionally or alternatively, environmental data is collected from sensors on one or more computing devices within the computer system described herein (e.g., user computing devices).

A "geographic area," as used herein, may refer to any geographic area that may be pre-selected and/or pre-defined, such as a city, metro area, zip code, county, state, etc.

As used herein, "standard driving behavior" may be used to refer to operation of a vehicle that is within a predefined range of an average and/or typical operation or driving behavior. This average and/or typical operation may be determined based upon the aggregation of vehicle-based telematics data for a plurality of vehicle that operate within a geographic region, as described herein. Moreover, the standard driving behavior incorporates location, as well as operation, of a vehicle. For example, standard driving behavior may include a first speed and/or acceleration in a location A, and a second speed and/or acceleration in location B. That is, there is no single speed, acceleration, braking, cornering, etc. that is considered "standard" across an entire geographic area. In this way, the standard driving behavior may account for different operation of a vehicle that is appropriate in different locations and contexts (e.g., entering a highway via an interchange lane vs. driving through a neighborhood or school zone).

EXEMPLARY EMBODIMENTS

In the exemplary embodiment, a computer system is configured to leverage telematics data, including vehicle-based telematics data, to define standard driving behavior within a geographic area and, based thereupon, to generate precise and refined driving behavior risk models. The telematics data, as well as other data as described herein, may be received from a plurality of sources, including a user's mobile device and/or one or more connected vehicles. Additionally or alternatively, the computer system may receive and analyze additional data, such as geolocation data, environmental data, and/or vehicle characteristics, to define the standard driving behavior and/or generate the risk models. In the exemplary embodiment, the computer system may capture and synthesize this data, leveraging machine-learning and/or artificial-intelligence techniques, to generate risk models that are location-dependent and precise, and enable the optimization of insurance coverage and cost across a geographic area. It should be understood that in at least some embodiments, there may be manual actuarial and/or underwriting review and/or monitoring of models, policies, or recommendations generated based upon artificial intelligence, for consideration of both individual model factors and combinations of model factors.

In some embodiments, the computer system may receive, retrieve, capture, and/or otherwise access telematics data, geolocation data, other sensor data, environmental data, vehicle characteristics, and/or additional or alternative data from a user's mobile device, one or more connected vehicles, and/or one or more third-party or external sources. The computer system may include any suitable data storage capabilities, such as cloud storage, to access and/or store any of the above data. In that way, the computer system may access and analyze historical and/or current (e.g., real-time or near real-time) data. In the exemplary embodiment, the computer system includes at least one data analytics computing device. The data analytics computing device is configured to perform the functions that may be more generally described herein as being performed by and/or attributed to the overall computer system.

In particular, in the exemplary embodiment, the data analytics computing device may be in communication with one or more computing devices associated with a user. These computing devices may include a personal mobile computing device, such as a smart phone, tablet, mobile device, wearable, smart glasses, smart watch, and the like. These computing devices may additionally or alternatively include a vehicle computing device associated with a personal vehicle of the user (e.g., a vehicle that the user drives or operates, which may be a non-autonomous, semi-autonomous, and/or autonomous vehicle) and/or any other vehicle used by one or more users (e.g., personal mobility vehicles, shared vehicles, public transportation vehicles, etc.). A vehicle computing device may include a computing device integral to the vehicle and/or a personal mobile computing device that is in, on, or otherwise associated with the vehicle while the vehicle is operating.

The data analytics computing device may receive data from the computing device(s) (such as via wireless communication or data transmission over one or more radio frequency links and/or via one or more communication networks), including telematics data associated with motion of the user and/or an associated vehicle (which may include speed, acceleration, braking, cornering, location, route, direction of travel, and other information), geolocation data associated with a location of the user and/or the associated vehicle, other sensor data, environmental data, and/or any other type of data. The data analytics computing device may receive portions of such data from alternative computing devices, such as third-party computing devices. Additionally or alternatively, the data analytics computing device may access portions of such data from one or more databases or other memory devices. That is, the data analytics computing device need not receive data in "real-time" in order to perform the methods described herein, but may receive data in "real-time."

The data analytics computing device may be configured to aggregate, combine, synthesize, parse, compare, and/or otherwise process this data, as described in more detail herein, in order to (i) define, or generate a profile of, standard driving behavior within a geographic area, (ii) generate driving behavior risk models that are location-dependent and highly precise, as well as able to be dynamically updated and/or refined (e.g., in real-time, in response to current or real-time data), (iii) enable insurance coverage and/or cost optimization based upon the risk models, and/or (iv) generate and transmit recommendations, notifications, and/or alerts associated with outcomes of the risk models. Any of these processes may, in certain embodiments, undergo manual monitoring or review for consideration of input factors or model outputs.

In particular, the data analytics computing device may leverage (historical) geolocation and/or telematics data for a plurality of vehicles within a geographic area to define standard driving behavior for that geographic area. The data analytics computing device may receive and store and/or may generate definitions of geographic areas to perform these analyses. Geographic areas may have one or more identifiers associated therewith. For example, geographic areas may be "nested" and have identifiers for each "nest" level. A single location may be within geographic areas including a street, a neighborhood, a ZIP+code, a ZIP code, a city, a county, a metro area, a state, a region, and a country, with each such level having its own identifier. Each geographic area may be additionally or alternatively defined relative to one or more maps and/or defined based upon boundaries using latitude/longitude coordinates. For instance, a geographic area may be defined using a range of coordinate values.

The data analytics computing device may define standard behavior for a particular geographic area by aggregating and analyzing data from vehicles operated within that geographic area. In some embodiments, the data analytics computing device may identify a plurality of vehicles are associated with the geographic area based upon, for example, where the vehicles are registered, insured, and/or serviced. For instance, the data analytics computing device may access an external database (or request data therefrom) including vehicle registration, insurance, and/or maintenance information. Once the plurality of vehicles are identified, the data analytics computing device may receive, request, retrieve, and/or otherwise access vehicle operation data (e.g., geolocation data and telematics data) for those vehicles (e.g., directly from the vehicles, from user computing devices of vehicle users of the vehicles, and/or from a database).

Additionally or alternatively, vehicle operation data (e.g., geolocation data and telematics data) for a plurality of vehicles may be stored in a database and indexed based upon geolocation data (e.g., defining where telematics data for the vehicle was captured). In such instances, the data analytics computing device may receive, request, retrieve, and/or otherwise access data from such a database by receiving, requesting, retrieving, and/or otherwise accessing vehicle operation data (e.g., geolocation data and telematics data) for geolocation(s) within the geographic area, for example, using one or more identifiers of the geographic area. In some exemplary embodiments, the vehicle operation data includes telematics data including speed, acceleration, cornering, and/or braking data captured by respective telematics sensors in each vehicle and/or in vehicle computing device(s) within each vehicle (e.g., in-vehicle computing devices integral to and/or coupled to the vehicles, user computing devices of users within the vehicles, etc.).

The data analytics computing device may then use artificial-intelligence and/or machine-learning/deep-learning techniques to map aggregated vehicle operation data across the geographic area, and define standard driving behavior as location-specific vehicle operation across the geographic area. In some exemplary embodiments, the standard driving behavior may include a location-specific standard speed, acceleration, cornering, and/or braking within the geographic area. As used herein, "location-specific" refers to the variation of vehicle operation across a geographic area, and may be as granular as, for example, intersection-specific driving behavior. For instance, the standard driving behavior including the location-specific vehicle operation accounts for actual differences in users' driving behavior at different locations in the geographic area, such as a highway interchange versus a neighborhood street.

The data analytics computing device may leverage both telematics data and geolocation data (e.g., using time-stamps for both sets of data) to ensure the telematics data is captured at a particular location at a particular time, and to enable the mapping of telematics data to a location within the geographic area. This level of granularity enables improved precision in risk models, such that drivers may not be penalized (e.g., considered to be driving in a more risky manner) for operating their vehicles in a manner that is appropriate for their specific geolocation.

The data analytics computing device may include or factor in additional data in defining the standard driving behavior.

In some embodiments, the data analytics computing device may process vehicle characteristics as part of the process for defining standard driving behavior. The data analytics computing device may receive, retrieve, request, and/or otherwise access vehicle characteristics for the plurality of vehicles associated with the geographic area. The vehicle characteristics may include, for example, a vehicle make, vehicle model, vehicle age, and/or vehicle type for each vehicle. A "vehicle type" may include a grouping that covers a plurality of vehicle models; exemplary vehicle types may include sedans, coupes, vans, mini-vans, compact utility vehicle (CUVs), sport utility vehicles (SUVs), trucks, pick-up trucks, sports cars, and the like. Additional, fewer, and/or alternative vehicle types may be used. The vehicle characteristics may be stored in a database, may be received from a vehicle/in-vehicle computing device or user computing device, and/or may be otherwise received, retrieved, requested, and/or accessed by the data analytics computing device.

The data analytics computing device may apply the artificial-intelligence and/or machine-learning/deep-learning techniques to the vehicle characteristics (as well as the vehicle operation data) to define standard driving behavior across the geographic area. It is recognized that different vehicle types, makes, models, and/or ages may be operated differently and still have such operation considered low-risk, safe, or standard. For example, a late-model sports car may be able to corner at a first speed and/or accelerate at a first rate, and such vehicle operation is within standard or acceptable operation of that vehicle. However, such cornering or accelerating may be unsafe for an SUV or an older van, for example. Accordingly, the defined standard driving behavior may be designed to account for variations in vehicle characteristics.

In some embodiments, the data analytics computing device may process environmental data as part of the process for defining standard driving behavior. The data analytics computing device may receive, retrieve, request, and/or otherwise access the environmental data for the geographic area, for example, by querying one or more databases using an identifier of the geographic area. As described herein, environmental data may include, for example, weather data, crime data, traffic data, accident data, insurance claim data, time/date, season, and the like.

The data analytics computing device may apply the artificial-intelligence and/or machine-learning/deep-learning techniques to the environmental data (as well as the vehicle operation data) to define standard driving behavior across the geographic area. In particular, it is recognized that vehicle operation may vary based upon a variety of environmental factors represented by the environmental data. For example, vehicles may be operated at slower average or typical speeds during rainy weather, during certain times of day (e.g., rush hour), or around accidents. Accordingly, standard driving behavior may not only be location-dependent but may further be environment-dependent.

In some embodiments, the data analytics computing device may process image data as part of the process for defining standard driving behavior. The data analytics computing device may receive, retrieve, request, and/or otherwise access the image data for the geographic area, for example, by querying one or more sources of satellite images, geospatial images, and/or vehicle-captured images for the geographic area. The images may depict or represent infrastructure associated with the geographic area, such as road types (e.g., surface material, road condition, number of lanes, presence/absence of a bike lane), traffic control measures (e.g., traffic lights, stop signs, speed limits, speed bumps, crosswalks), usage (e.g., traffic density, pedestrians, bicyclists, public transportation), non-road infrastructure (e.g., sidewalks, buildings), and/or any other infrastructure details.

The data analytics computing device may apply the artificial-intelligence and/or machine-learning/deep-learning techniques to the image data (as well as the vehicle operation data) to define standard driving behavior across the geographic area. In some embodiments, the data analytics computing device may perform image-processing techniques to identify and catalog various infrastructure characteristics therein, which may then be further processed with the vehicle operation data to define the standard driving behavior. In particular, it is recognized that vehicle operation may vary based upon these infrastructure characteristics. For example, vehicle speeds may be, on average, lower on one-lane roads, or roads with multiple traffic lights and/or stop signs, than on freeways.

Moreover, in some embodiments, the data analytics computing device may perform additional analysis on and/or using the image data and/or infrastructure characteristics determined therefrom. In particular, the data analytics computing device may apply machine-learning techniques to the image data and/or infrastructure characteristics determined therefrom to define an infrastructure complexity score for the geographic area. The infrastructure complexity score is a quantitative representation of the relative ease or difficulty of driving within any geographic area.

The infrastructure complexity score may be used in a variety of ways. For example, the infrastructure complexity score may be used to further refine the driving behavior risk models. In some cases, an infrastructure complexity score that represents a greater degree of driving difficulty in a geographic area (or locations within a geographic area) may increase a level of risk represented in the driving behavior risk models (e.g., the risk models may reflect an overall higher level of risk based upon a greater level of driving difficulty). As another example, the infrastructure complexity score may be transmitted to one or more other parties (e.g., client computing devices of such receiving parties), such as an insurance server, a city planning entity, a civil engineering entity, and the like.

In the exemplary embodiment, the data analytics computing device may generate one or more driving behavior risk models based upon the standard driving behavior, which is determined using any combination of processes described above and/or elsewhere herein. The driving behavior risk models translate the standard driving behavior into acceptable and/or expected (location-specific) levels of risk across the geographic area. For example, in some embodiments, where a location within a geographic area is associated with high speeds, high acceleration, hard braking, or the like, even though that behavior is "standard," it may still represent a high-risk area for accidents or a greater risk for accidents with greater levels of damage. This example area may not be an area that would otherwise typically be associated with high risk, but the standard driving behavior revealed the higher risk. In some embodiments, the driving behavior risk models may normalize or adjust for objectively "higher risk" driving behavior (e.g., speeds above a speed limit, high acceleration, hard braking, etc.) that is demonstrated to be actually standard driving behavior at a location within the geographic area. The models may account for these locations by reducing the impact of the "higher risk" driving behavior in determining the risk level for these locations.

Thereby, the driving behavior risk models are granular and specific to a geographic area, accounting for location-specific variation in actual driving behavior to determine a level of risk for that area. These risk models may therefore be leveraged to optimize insurance coverage and costs across the geographic area. These risk models may additionally be leveraged to generate recommendations to vehicle users of locations (e.g., high-risk locations) to avoid, or how to adjust driving behavior in such locations. Any of these processes may, in certain embodiments, undergo manual monitoring or review for consideration of input factors or model outputs.

The data analytics computing device may apply the driving behavior risk models to existing vehicle operation data (e.g., geolocation data and/or telematics data) to determine whether a vehicle user—who has an insurance policy associated with their vehicle—has standard or non-standard driving behavior in certain locations within the geographic area and, therefore, whether that vehicle user has the appropriate level of coverage, insurance premium, deductible, or other parameter of the insurance policy. For example, the vehicle operation data may include high acceleration that would be interpreted as high-risk driving behavior in conventional risk models that fail to account for location-specific variations in acceleration. In accordance with the exemplary embodiment, the driving behavior risk model, when applied to the vehicle operation data for this vehicle user, would recognize that this high acceleration, in the particular location in which it occurred, is within the range of standard driving behavior at that location. Therefore, the vehicle user's behavior may be labelled, scored, or otherwise interpreted as within a standard level of risk, thereby avoiding increased insurance costs (or, in some cases, actively decreasing a previously calculated insurance cost) for the vehicle user. It should be readily understood that the phrases "applying the risk models to data" and "applying data to the risk models" are equivalent phrases used herein to describe using computer-generated models to interpret data.

In some exemplary embodiments, the output(s) from the driving behavior risk models are evaluations of a vehicle user's risk level, based upon their own driving behavior (as represented by the vehicle operation data). These outputs may be scores (e.g., a score from 1-100). In some such cases, high scores may represent high risk, and low scores may represent low risk. Alternatively, high scores may represent low risk, and low scores may represent high risk. Additional or alternative outputs may be grades (e.g., a letter grade from A-F, a tiered grade from "very poor" to "excellent", etc.), binary recommendations (e.g., "insure," "do not insure" or "recommend," "do not recommend"), tiered recommendations (e.g., "insure with low premium" vs. "insure with standard premium"), or any suitable quantitative and/or qualitative evaluation(s). It should be understood that in at least some embodiments, there may be manual actuarial and/or underwriting review and/or monitoring of models, policies, or recommendations generated based upon artificial intelligence, for consideration of both individual model factors and combinations of model factors.

In some embodiments, the data analytics computing device may be configured to determine whether a new vehicle user (a "subject vehicle user") is eligible for an insurance policy for their vehicle (a "subject vehicle") and, if so, what the parameters of an offered insurance policy should be, by applying their vehicle operation data (e.g., "subject vehicle operation data," "subject geolocation data" and/or "subject telematics data") to the driving behavior risk models. More specifically, the data analytics computing device may receive the subject vehicle operation data for the subject vehicle (operated by the subject vehicle user) within the geographic area for an interval of time (e.g., one week, two weeks, one month, etc.). In some instances, this subject vehicle operation data may be received in real-time or periodically during the interval of time, from a user computing device, from the vehicle, and/or from a computing device coupled to the vehicle (e.g., a beacon device). In other instances, the subject vehicle operation data may be received all at once, after the interval of time is complete. The subject vehicle operation data may be received as part of a request, for example, an insurance quote request initiated by the subject vehicle user. In some embodiments, the request may include additional data, such as vehicle characteristics of the subject vehicle.

The data analytics computing device may apply the driving behavior risk models for that geographic area to the subject vehicle operation data to generate or output a driving behavior score (and/or other evaluation) for the subject vehicle. In some embodiments, the data analytics computing device may apply the driving behavior risk models to additional data to generate the driving behavior score, such as the vehicle characteristics. As another example, the data analytics computing device may retrieve (or otherwise access) environmental data for the interval of time and may further apply the driving behavior risk models thereto. For instance, the environmental data may reflect that two days within a week-long interval of time were rainy, the subject vehicle was driven near an accident once during the interval of time, and the like.

Based upon the driving behavior score, the data analytics computing device may determine whether to insure the subject vehicle (and/or the subject vehicle user). The data analytics computing device may, in some embodiments, further determine one or more parameters of an insurance policy to offer the subject vehicle user, such as a coverage level, a premium, a deductible, and/or any other associated parameter. For example, where the output from the driving behavior risk models indicates that the subject vehicle user is a low-risk driver (e.g., avoids high-risk locations, drives at standard driving behavior or better, etc.), the data analytics computing device may generate an insurance quote with a lower than average premium for a coverage level, a low deductible, an enhanced rewards program (e.g., in which the vehicle user's driving behavior will accrue them rewards faster), and the like. The data analytics computing device may transmit a response including the score (and/or any other evaluations), the insurance quote offer, and/or any other related data back to the subject vehicle user. It should be understood that in at least some embodiments, there may be manual actuarial and/or underwriting review and/or monitoring of models, policies, or recommendations generated based upon artificial intelligence, for consideration of both individual model factors and combinations of model factors.

Additionally or alternatively, the data analytics computing device may provide the driving behavior score (and/or any other outputs form the driving behavior risk models) to another party to make such determination. In some such instances, the data analytics computing device may also provide a recommendation to the other party based upon the driving behavior score.

Likewise, as described above, the data analytics computing device may perform the same or similar analyses for existing policyholders. Based upon the driving behavior score, the data analytics computing device may determine whether and/or how to adjust one or more parameters of an existing insurance policy (e.g., reducing a premium, offering a credit or reward, etc.). It should be understood that in at least some embodiments, there may be manual actuarial and/or underwriting review and/or monitoring of models, policies, or recommendations generated based upon artificial intelligence, for consideration of both individual model factors and combinations of model factors.

In some exemplary embodiments, the data analytics computing device may be further configured to perform any of the above calculations, determinations, and/or analyses in real-time. More particularly, the data analytics computing device may receive real-time telematics data and geolocation data (and/or any other vehicle operation data) associated with any number of vehicles within the geographic area. The real-time data represents real-time operation of the vehicles within the geographic area, and may be received within seconds or minutes of being generated at the vehicle and/or computing device from which the real-time data is received.

Using the real-time vehicle operation data, the data analytics computing device may determine real-time driving behavior within the geographic area. In the exemplary embodiment, the data analytics computing device uses the same processes described above with respect to determining the standard driving behavior, to determine the real-time driving behavior. In some embodiments, the real-time driving behavior includes separate data, similar to the standard driving behavior, such as representations of speed, acceleration, braking, cornering, and the like, at locations (e.g., coordinates) within the geographic area. In other embodiments, the real-time driving behavior is represented as variations of or deviations from the standard driving behavior at those locations, which may require reduced data storage requirements.

The data analytics computing device may generate a real-time driving behavior map representative of the real-time driving behavior within the geographic area. As described above, the real-time driving behavior may be represented as a comparison to the standard driving behavior for the geographic area. For example, where the real-time driving behavior is worse (e.g., riskier, higher speed, reflecting harder cornering or braking, etc.) than the standard driving behavior, the real-time behavior map may include a higher-risk indicator. It should be understood that the real-time driving behavior map may or may not be displayed; that is, the map may be a theoretical "map," where location coordinates within the geographic area are associated with values or strings representing standard driving behavior, real-time driving behavior, localized environmental data, etc. Additionally or alternatively, the map may displayed on a graphical user interface to one or more users, such as vehicle users and/or users associated with an insurance company, etc. Where the map is displayed, any indicators (e.g., representing real-time variations from standard driving behavior) may be represented as icons, text, shading or variation in color (e.g., as part of a "heat map"), and/or in any other manner.

The data analytics computing device may use the real-time driving behavior to dynamically update the driving behavior risk models. This dynamic updating may improve real-time risk modelling, and enable more granular, precise, and user-specific evaluation of risk and driving behavior.

The data analytics computing device may identify one or more specific locations (e.g., coordinates, ranges of coordinates, points of interest, intersections, streets, etc.) that are experiencing non-standard real-time driving behavior. Where that non-standard real-time driving behavior represents higher-risk driving behavior, the data analytics computing device may generate an alert that includes the identified location(s) and, in some embodiments, an indication of the non-standard driving behavior (e.g., harder braking, significantly lower speeds, etc.). In some embodiments, the non-standard driving behavior may be some threshold deviation from the standard driving behavior in order for the data analytics computing device to generate the alert. The threshold deviation may be an absolute value deviation, a percentage deviation, or any other defined deviation that represents a significant change between the standard driving behavior and the real-time driving behavior in a location. In some embodiments, where the standard driving behavior accounts for environmental variations (e.g., between sunny days and rainy days), the threshold deviation may also account for such variations.

The data analytics computing device may transmit the alert to one or more vehicle computing devices (e.g., in-vehicle computing devices, user computing devices, etc.). The data analytics computing device may determine which vehicles are within a distance range of the identified location, which vehicles are associated with a route that includes the identified location, and/or which vehicles are within the geographic area, to determine which computing devices to which to transmit the alert. In at least some embodiments, the determination to send an alert many be manually reviewed, for appropriate consideration of input factors and model outputs.

Additionally or alternatively, the data analytics computing device may generate and transmit instructions to re-route along an alternate route to avoid the identified location. In such embodiments, the data analytics computing device analyzes the real-time driving behavior map to identify one or more alternate routes that (i) enable a vehicle to avoid the identified location(s), and (ii) are not experiencing non-standard driving behavior or are experiencing non-standard driving behavior of a lower magnitude or significance. Where the data analytics computing device identifies a plurality of available alternate routes, the data analytics computing device may be configured to generate and transmit a corresponding plurality of instruction messages, or a set of instruction messages. Each instruction message includes respective instructions to re-route along one alternate route of the plurality of alternate routes. The data analytics computing device may transmit different instruction messages of the set of instruction messages to different vehicle computing devices. In this way, no single alternate route receives all of the re-routed traffic. The data analytics computing device may transmit the different instruction messages randomly (e.g., based upon output from a random number generator), in series (e.g., Route 1 to vehicle A, Route 2 to vehicle B, Route 3 to vehicle C, Route 1 to vehicle D, Route 2 to vehicle E, etc.), or according to capacity of the alternate route (e.g., a single-lane country road vs. a two-lane street through town).

In some embodiments, the data analytics computing device may be configured to leverage the standard and/or real-time driving behavior to otherwise advise or instruct users' individual driving behavior. For example, the data analytics computing device may provide recommendations or instructions for a trip, to reduce risk associated with taking that trip. In particular, the data analytics computing device may receive a trip definition for a future trip that will be undertaken by a vehicle user. The data analytics computing device may receive the trip definition from, for example, a user computing device of the vehicle user. The trip definition may include a start location, an end location, and an anticipated trip date. In some embodiments, at least one of the start location or the end location are in a geographic area for which the above-described driving behaviors and/or risk models have been generated. In some embodiments, the entire trip is within the geographic area, or within multiple geographic areas modelled by the data analytics computing device.

The data analytics computing device may identify, based upon at least one of the standard driving behavior or the driving behavior risk models, a recommended start time for the future trip. For instance, the data analytics computing device may execute a plurality of simulations of the future trip with varying start times, and may rank the simulations based upon an overall level of risk, based upon the respective start time. The recommended start time may be associated with the simulation associated with the lowest overall level of risk. For example, starting a trip at Time 1 may enable the vehicle user to avoid "rush hour" at the end location or an intermediate location between the start location and the end location.

Additionally or alternatively, the data analytics computing device may identify, from the plurality of executed simulations, at least one recommended break time and/or location. For example, the plurality of simulations may reveal that a user is likely to encounter one or more high-risk locations regardless of a start time, but that if the user takes a half-hour break at an intermediate location, the high-risk location(s) are avoided (e.g., the rush hour is over). The data analytics computing device may transmit the at least one recommended break time and/or location to the vehicle user's computing device.

In some embodiments, the data analytics computing device may leverage real-time driving behavior to modify the recommended start time and/or break time/location. For instance, real-time driving behavior may reveal an accident along the route that could not have been predicted by the standard driving behavior. The data analytics computing device may determine an alternate route, an alternate start time, and/or an alternate break time/location that would enable the vehicle user to avoid that location, and may transmit any of these data to the vehicle user in a notification or alert message.

Any data described herein may be displayed to a vehicle user, where appropriate, within a user interface of a software application ("app") stored and/or executed on a computing device. For example, maps, alerts, notifications, instructions, recommendations, and the like may all be displayed to the vehicle user, upon request and/or upon receipt from the data analytics computing device. Alerts, notifications, instructions, responses to requests, and/or any other such messages may be transmitted as SMS messages, email messages, push notifications, in-app messages, and/or in any other suitable format.

The data analytics computing device may store any received, retrieved, and/or accessed data in one or more databases, and may store any definitions, models, maps, routes, and/or other generated data in the one or more databases. A database may be any suitable storage location, and may in some embodiments include a cloud storage device such that the database may be accessed by a plurality of computing devices (e.g., a plurality of data analytics computing devices, insurance computing devices, third-party computing devices, etc.). The database may be integral to the data analytics computing device or may be remotely located with respect thereto.

The methods and system described herein may be implemented using computer programming or engineering techniques including computer software, firmware, hardware, or any combination or subset. As disclosed above, at least one technical problem with current systems includes the inability to reconcile data from disparate sources, including telematics data (which may include speed, acceleration, braking, cornering, location, route, direction of travel, and other information), sensor data, and environmental data, without time-consuming and error-prone human intervention. As such, current systems may be limited in how they can use data to generate profiles of standard driving behavior, which leads to less accurate and/or precise evaluations of driving behavior within a geographic area. In such cases, a user's driving behavior may be characterized as more or less risky, without accounting for actual conditions at locations where the user drives.

The technical effect of the systems and processes described herein may be achieved by performing at least one of the following actions: (a) receiving geolocation data and telematics data associated with a plurality of vehicles, the geolocation data captured at a location sensor of a vehicle computing device and representative of a location of the vehicle, the telematics data captured at a plurality of sensors of at least one of the vehicle or the vehicle computing device and representative of movement of the vehicle, the plurality of vehicles associated with a geographic area; (b) applying machine-learning techniques to the geolocation data and the telematics data to define standard driving behavior within the geographic area; and/or (c) generating driving behavior risk models for the geographic area based upon the standard driving behavior.

The technical effect of the systems and processes described herein may be additionally or alternatively achieved by performing at least one of the following actions: (d) receiving vehicle characteristics associated with each vehicle of the plurality of vehicles, the vehicle characteristics including at least one of a respective vehicle make, vehicle model, vehicle age, or vehicle type of each vehicle; (e) applying machine-learning techniques to the geolocation data, the telematics data, and the vehicle characteristics to further define standard driving behavior for each of a plurality of vehicle types within the geographic area; (f) receiving environmental data for the geographic area; (g) applying machine-learning techniques to the geolocation data, the telematics data, and the environmental data to further define standard driving behavior within the geographic area; (h) receiving image data associated with the geographic area, the image data including images of road infrastructure of the geographic area; (i) applying machine-learning techniques to the image data to define an infrastructure complexity score for the geographic area; (j) further generating the driving behavior risk models based upon the infrastructure complexity score; (k) receiving subject telematics data and subject geolocation data for an interval of time for a subject vehicle within the geographic area; (l) applying the driving behavior risk models to the subject telematics data and subject geolocation data to generate a driving behavior score for the subject vehicle; (m) determining whether to insure the subject vehicle based upon the driving behavior score; (n) receiving real-time telematics data and geolocation data associated with at least a portion of the plurality of vehicles within the geographic area; (o) generating a real-time driving behavior map representative of real-time driving behavior within the geographic area; (p) identifying a location within the geographic area experiencing non-standard driving behavior; (q) transmitting an alert to one or more vehicle computing devices, the alert including the identified location and the non-standard driving behavior; (r) identifying a location within the geographic area experiencing non-standard driving behavior; (s) transmitting instructions to one or more vehicle computing devices to re-route along an alternate route to avoid the identified location; (t) identifying a plurality of alternate routes to avoid the identified location; (u) generating a set of instruction messages, each instruction message including respective instructions to re-route along one alternate route of the plurality of alternate routes; (v) transmitting one of the set of instruction messages to each one or more vehicle computing devices; (w) dynamically updating the driving behavior risk models based upon the real-time driving behavior within the geographic area; (x) receiving a trip definition for a future trip, the trip definition including a start location, an end location, and an anticipated trip date, wherein at least one of the start location or the end location are in the geographic area; (y) identifying, based upon at least one of the standard driving behavior or the driving behavior risk models, a recommended start time for the future trip; and/or (z) transmitting the recommended start time to a computing device of an individual associated with the future trip The resulting technical effects may include, for example: (i) profiling actual standard driving behavior within a geographic area at a location-specific level; (ii) using the actual standard driving behavior to develop risk models that are reflective of actual risk; (iii) incorporating additional data to enhance the precision of these profiles and models; (iv) optimizing insurance coverage and cost across a geographic area based upon more precise risk assessments available from such models; (v) improving user recommendations by identifying locations experiencing real-time non-standard driving behavior; and/or (vi) encouraging safer driver or risk averse behavior based upon such recommendations.

Exemplary Computer System for Generating Refined Risk Models Responsive to Vehicle-Based Telematics Data FIG. 1 depicts a schematic diagram of an exemplary computer system 100. Computer system 100 may be configured to generate refined risk models responsive to vehicle-based telematics data. In one exemplary embodiment, computer system 100 may include and/or facilitate communication between one or more vehicles 102 (e.g., via an in-vehicle computing devices 104 and/or communication devices 106), one or more user computing devices 108 (which may also be referred to as "mobile devices"), and a data analytics computing device 110, and/or between data analytics computing device 110 and one or more of third party devices 112 and/or insurance servers 114.

Data analytics computing device 110 may be implemented as a server computing device with artificial-intelligence and machine-learning/deep-learning functionality. Alternatively, data analytics computing device 110 may be implemented as any device capable of interconnecting to the Internet, including mobile computing device or "mobile device," such as a smartphone, a "phablet," smart glasses, smart watch, wearable, or other web-connectable equipment or mobile devices. Data analytics computing device 110 may be in communication with vehicles 102, one or more user computing devices 108, third party devices 112, and/or insurance servers 114, such as via wireless communication or data transmission over one or more radio frequency links or wireless communication channels. In the exemplary embodiment, components of computer system 100 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular telecommunications connection (e.g., a 3G, 4G, 5G, etc., connection), a cable modem, and a BLUETOOTH connection.

Computer system 100 also includes one or more database(s) 116 containing information on a variety of matters. For example, database 116 may include such information as geolocation data, telematics data, environmental data, image data, driving behavior profiles, standard driving behavior definitions, risk models, vehicle characteristics, infrastructure complexity scores, insurance policies, trip definitions, recommendations, and/or any other information used, received, and/or generated by computer system 100 and/or any component thereof, including such information as described herein. In one exemplary embodiment, database 116 may include a cloud storage device, such that information stored thereon may be securely stored but still accessed by one or more components of computer system 100, such as, for example, data analytics computing device 110, in-vehicle computing devices 104, user computing devices 108, and/or insurance servers 114. In one embodiment, database 116 may be stored on data analytics computing device 110. In any alternative embodiment, database 116 may be stored remotely from data analytics computing device 110 and may be non-centralized.

Computer system 200 includes a plurality of vehicles 102 registered therewith, where each vehicle 102 is associated with at least one respective driver user and may have an insurance policy associated therewith (e.g., where insurance policies maintained by insurance server 114). In the exemplary embodiment, each vehicle 102 includes a communication device 106 such that the vehicle 102 may communicate with data analytics computing device 110, for example, via the Internet, to receive instructions and/or transmit telematics data, geolocation data, other sensor data, and/or other information. Vehicle 102 may additionally communicate with other components of computer system 100, such as database 116, user computing device(s) 108, insurance server 114, etc.

Vehicles 102 may be configured to capture and/or generate telematics, geolocation, and/or other sensor data during operation thereof (whether the vehicles are autonomous, semi-autonomous, and/or manually driven). Specifically, vehicles 102 have one or more sensors disposed thereon, such as location sensors, audio sensors, video sensors, cameras, LIDAR, RADAR, GPS/navigation systems, acceleration/deceleration sensors, braking sensors, turning sensors, scanners, and/or any other sensor, including those described elsewhere herein.

The sensors operate and collect and/or generate telematics and/or sensor data passively and/or actively as the vehicle 102 operates. The sensors may detect, for example, conditions of vehicle 102, such as speed, acceleration, braking, cornering, direction, heading, route, destination, gear, and other conditions related to the operation of vehicle 102, for example: at least one of a measurement of at least one of speed, direction, rate of acceleration, rate of deceleration, location, position, orientation, and rotation of the vehicle, and a measurement of one or more changes to at least one of speed, direction, rate of acceleration, rate of deceleration, location, position, orientation, and rotation of the vehicle. In some embodiments, the sensor data includes information captured about the environment and/or other objects around the vehicle (e.g., infrastructure, weather, other vehicles, people, etc.). Data analytics computing device 110 may receive any such data from vehicles 102 (e.g., via in-vehicle computing device 104 and communication device 106).

In the exemplary embodiment, user computing devices 108 may be computers that include a web browser or a software application to enable user computing devices 108 to access the functionality of data analytics computing device 110 using the Internet or a direct connection, such as a cellular network connection. User computing devices 108 may be any device capable of accessing the Internet including, but not limited to, a desktop computer, a mobile device (e.g., a laptop computer, a personal digital assistant (PDA), a cellular phone, a smartphone, a tablet, a phablet, netbook, notebook, smart watches or bracelets, smart glasses, wearable electronics, pagers, etc.), or other web-based connectable equipment. Each user computing device 108 may be associated with a particular user, which may include vehicle user and/or an insured associated with an insurance policy offered by insurance server 114.

User computing devices 108 may be used to access a data management app (e.g., a telematics collection app, insurance app, and/or game app) 120 maintained by data analytics computing device 110, for example, via a user interface 122 when data management app 120 is executed on user computing device 108. A user may use data management app 120 to provide inputs to data analytics computing device 110, change preferences (e.g., provide permission for data analytics computing device 110 to receive data from user computing device 108 and/or any other device, such as a vehicle 102), receive recommendations or alerts, view insurance policy information, and perform other actions, including those described elsewhere herein.

User computing devices 108 may be configured to capture and/or generate geolocation, telematics, and/or other data during operation thereof (e.g., while the user computing device 108 is on or active and/or in motion). Specifically, user computing devices 108 have one or more sensors 124 disposed thereon, such as location sensors, audio sensors, video sensors, cameras, GPS/navigation systems, accelerometers, gyroscopes, scanners, and/or any other sensor, including those described elsewhere herein. Sensors 124 operate and collect and/or generate geolocation, telematics, and/or other data passively and/or actively as user computing device 108 is operating. In some embodiments, the data includes information captured about the respective device's motion, the environment around the device (e.g., temperature, sounds, etc.), and objects around the device. Data analytics computing device 110 may receive any such data from user computing devices 108.

Data analytics computing device 110 may be configured to process geolocation data, telematics data, other sensor data, and/or any other data received from vehicles 102 and/or user computing devices 108, and/or data received from third-party devices 112, to identify, for a geographic area in which vehicle 102 are operated, a standard driving behavior, and to generate driving behavior risk models based thereupon. Data analytics computing device 110 may be further configured to leverage environmental data (which may be received from any of the above-described devices and/or accessed from database 116) to enrich, enhance, modify, and/or update the standard driving behavior and/or risk models. Data analytics computing device 110 may then use these models to identify whether/how to insure vehicles 102, update insurance policies associated therewith, reward users for driving behavior that is better (e.g., lower risk) than standard behavior, recommend routes to vehicle users and/or locations to avoid, and perform other actions as described elsewhere herein.

Third party devices 112 may be computing devices associated with external sources of data, such as sources of environmental data. Data analytics computing device 110 may request, receive, and/or otherwise access data from third party devices 112. Third party devices 112 may be any devices capable of interconnecting to the Internet, including a server computing device, a mobile computing device or "mobile device," such as a smartphone, or other web-connectable equipment or mobile devices.

Insurance server 114 may be associated with and/or maintained by an insurance provider, which provides insurance policies associated with vehicles 102, vehicle users, and the like. Insurance server 114 may communicate with data analytics computing device 110, vehicles 102, user computing device(s) 108, and/or database 116 in order to transmit and/or receive information associated with the insurance policies. For example, insurance server 114 may transmit insurance policies to data analytics computing device 110, and/or may receive or access standard driving behaviors, vehicle operation data, risk models, insurance quote offers, recommendations, and the like.

Exemplary Data Analytics Computing Device

Figure 2:
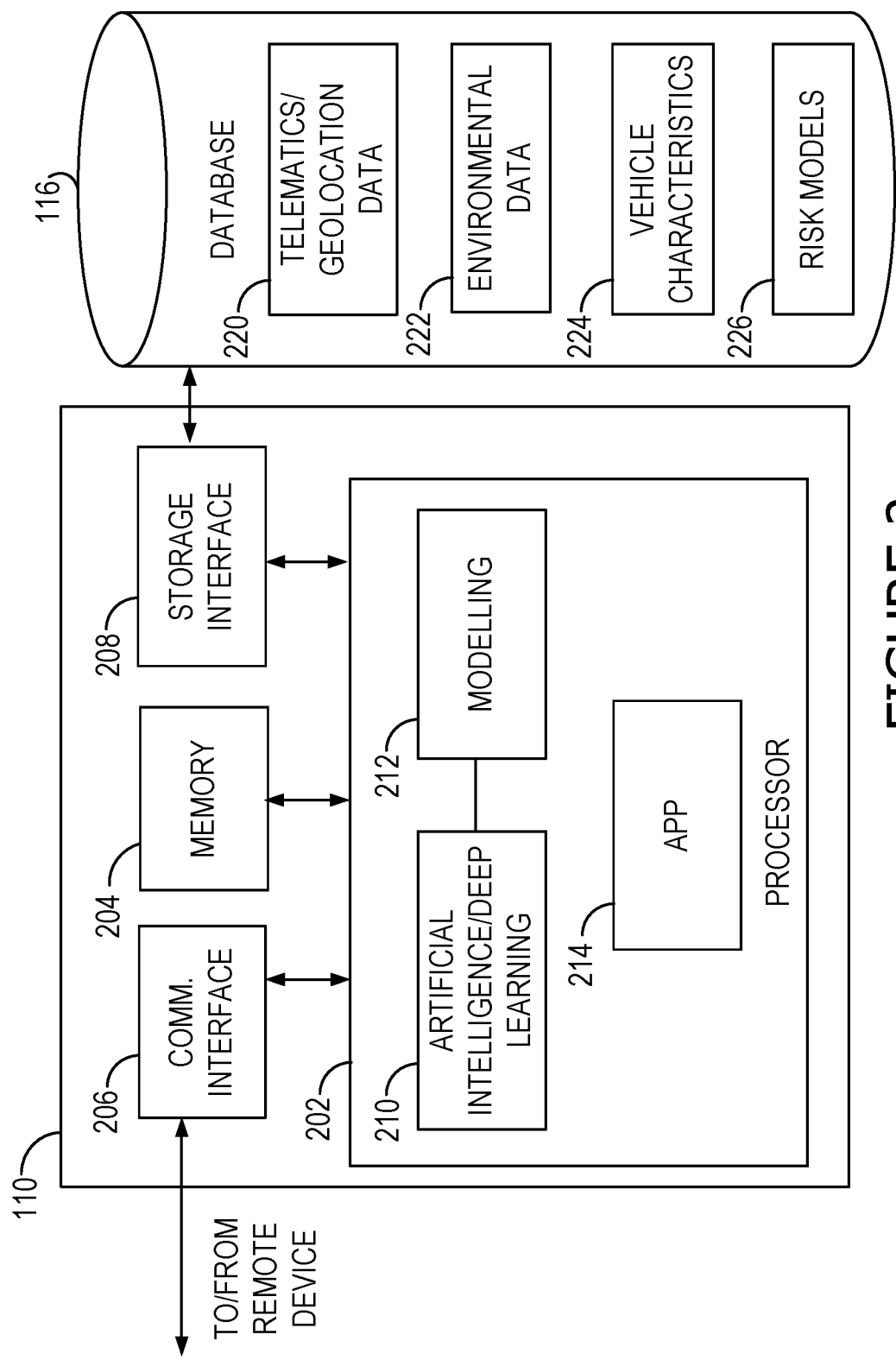
FIG. 2 illustrates a schematic diagram of an exemplary data analytics computing device that may be used in the computer system shown in FIG. 1.

FIG. 2 depicts an exemplary data analytics computing device 110 (as shown in FIG. 1). In one exemplary embodiment, data analytics computing device 110 may include a processor 202, a memory 204 (which may be similar to database 116, also shown in FIG. 1), a communication interface 206, and a storage interface 208. Processor 202 is configured to execute instructions, which may be stored in memory 204. Processor 202 includes one or more processing units (e.g., in a multi-core configuration) and may be configured to execute a plurality of modules.

In the exemplary embodiment, processor 202 is operable to execute an artificial intelligence/deep learning (AI/DL) module 210, a modelling module 212, and a module 214 that maintains functionality for data management app 120 (shown in FIG. 1). Modules 210, 212, and 214 may include specialized instruction sets, and/or coprocessors. Data analytics computing device 110, specifically processor 202, may include additional, alternative, and/or fewer modules. Database 116 and/or memory 204 may store any data and/or instructions necessary for modules 210, 212, and 214 to function as described herein. In the exemplary embodiment, database 116 may store telematics, geolocation, and/or other sensor data 220, environmental data 222, vehicle characteristics 224, and/or risk models 226. Database 116 may store additional and/or alternative data, as described elsewhere herein.

AI/DL module 210 may execute artificial intelligence and/or deep learning functionality on behalf of modelling module 212. Specifically, AI/DL module 210 may include any rules, algorithms, training data sets/programs, and/or any other suitable data and/or executable instructions that enable data analytics computing device 110 employ artificial intelligence and/or deep learning to generate the standard driving behavior, real-time driving behavior, and/or risk models 226, as described herein.

Data analytics computing device 110 may receive data (e.g., via communication interface 206) from vehicle computing device(s) (such as via wireless communication or data transmission over one or more radio frequency links), including telematics data 220 associated with motion of the user and/or an associated vehicle 102 (which may include speed, acceleration, braking, cornering, location, route, direction of travel, and other information), geolocation data 220 associated with a location of the user and/or the associated vehicle 102, other sensor data, environmental data 222, vehicle characteristics 224, and/or any other type of data. Data analytics computing device 110 may receive portions of such data from alternative computing devices, such as third-party computing devices. Additionally or alternatively, data analytics computing device 110 may access portions of such data from one or more databases 116 or other memory devices.

Data analytics computing device 110, and specifically AI/DL module 210, may leverage (historical) geolocation and/or telematics data 220 for a plurality of vehicles 102 within a geographic area to define standard driving behavior for that geographic area. Data analytics computing device 110 may receive and store and/or may generate definitions of geographic areas, as described herein, to perform these analyses. AI/DL module 210 may define standard behavior for a particular geographic area by aggregating and analyzing data from vehicles operated within that geographic area.

In some embodiments, data analytics computing device 110 may identify the plurality of vehicles 102 are associated with the geographic area based upon, for example, where vehicles 102 are registered, insured, and/or serviced. For instance, data analytics computing device 110 may access an external database (not shown) including vehicle registration, insurance, and/or maintenance information. Once vehicles 102 are identified, data analytics computing device 110 may receive, request, retrieve, and/or otherwise access vehicle operation data (e.g., geolocation data and telematics data 220) for those vehicles 102 (e.g., directly from vehicles 102, from user computing devices 108 of vehicle users of vehicles 102, and/or from a database).

AI/DL module 210 may then use artificial-intelligence and/or machine-learning/deep-learning techniques to map aggregated vehicle operation data across the geographic area, and define standard driving behavior as location-specific vehicle operation across the geographic area. In some exemplary embodiments, the standard driving behavior may include a location-specific standard speed, acceleration, cornering, and/or braking within the geographic area. AI/DL module 210 may leverage both telematics data and geolocation data 220 (e.g., using time-stamps for both sets of data) to ensure the telematics data is captured at a particular location at a particular time, and to enable the mapping of telematics data to a location within the geographic area. This level of granularity enables improved precision in risk models, such that drivers may not be penalized (e.g., considered to be driving in a more risky manner) for operating their vehicles in a manner that is appropriate for their specific geolocation.

AI/DL module 210 may include or factor in additional data in defining the standard driving behavior.

In some embodiments, AI/DL module 210 may process vehicle characteristics 224 as part of the process for defining standard driving behavior. AI/DL module 210 may apply the artificial-intelligence and/or machine-learning/deep-learning techniques to vehicle characteristics 224 (as well as the vehicle operation data, such as telematics/geolocation data 220) to define standard driving behavior across the geographic area.

In some embodiments, AI/DL module 210 may process environmental data 222 as part of the process for defining standard driving behavior. As described herein, environmental data 222 may include, for example, weather data, crime data, traffic data, accident data, insurance claim data, time/date, season, and the like. AI/DL module 210 may apply the artificial-intelligence and/or machine-learning/deep-learning techniques to environmental data 222 (as well as the vehicle operation data) to define standard driving behavior across the geographic area.

In some embodiments, AI/DL module 210 may process image data as part of the process for defining standard driving behavior. AI/DL module 210 may apply the artificial-intelligence and/or machine-learning/deep-learning techniques to the image data (as well as the vehicle operation data) to define standard driving behavior across the geographic area. In some embodiments, AI/DL module 210 may perform image-processing techniques to identify and catalog various infrastructure characteristics therein, which may then be further processed with the vehicle operation data to define the standard driving behavior. Moreover, in some embodiments, AI/DL module 210 may perform additional analysis on and/or using the image data and/or infrastructure characteristics determined therefrom. In particular, AI/DL module 210 may apply machine-learning techniques to the image data and/or infrastructure characteristics determined therefrom to define an infrastructure complexity score for the geographic area. The infrastructure complexity score is a quantitative representation of the relative ease or difficulty of driving within any geographic area.

In the exemplary embodiment, data analytics computing device 110, specifically modelling module 212, may generate one or more driving behavior risk models 226 based upon the standard driving behavior, which is determined using any combination of processes described above and/or elsewhere herein. Risk models 226 translate the standard driving behavior into acceptable and/or expected (location-specific) levels of risk across the geographic area. Risk models 226 are thereby granular and specific to a geographic area, accounting for location-specific variation in actual driving behavior to determine a level of risk for that area. Risk models 226 may therefore be leveraged to optimize insurance coverage and costs across the geographic area. Risk models 226 may additionally be leveraged to generate recommendations to vehicle users of locations (e.g., high-risk locations) to avoid, or how to adjust driving behavior in such locations.

Modelling module 212 may apply risk models 226 to existing vehicle operation data (e.g., geolocation/telematics data 220) to determine whether a vehicle user—who has an insurance policy associated with their vehicle 102—has standard or non-standard driving behavior in certain locations within the geographic area and, therefore, whether that vehicle user has the appropriate level of coverage, insurance premium, deductible, or other parameter of the insurance policy.

In some exemplary embodiments, the output(s) from risk models 226 are evaluations of a vehicle user's risk level, based upon their own driving behavior (as represented by the vehicle operation data). These outputs may be scores (e.g., a score from 1-100). In some such cases, high scores may represent high risk, and low scores may represent low risk. Alternatively, high scores may represent low risk, and low scores may represent high risk. Additional or alternative outputs may be grades (e.g., a letter grade from A-F, a tiered grade from "very poor" to "excellent", etc.), binary recommendations (e.g., "insure," "recommend," "do not recommend"), tiered recommendations (e.g., "insure with low premium," "insure with high discount," vs. "insure with standard premium"), or any suitable quantitative and/or qualitative evaluation(s).

In some embodiments, modelling module 212 may be configured to determine whether a new vehicle user (a "subject vehicle user") is eligible for an insurance policy for their vehicle 102 (a "subject vehicle") and, if so, what the parameters of an offered insurance policy should be, by applying their vehicle operation data (e.g., "subject vehicle operation data," "subject geolocation data" and/or "subject telematics data") to risk models 226. More specifically, modelling module 212 may receive (e.g., via communication interface 206) the subject vehicle operation data for the subject vehicle 102 (operated by the subject vehicle user) within the geographic area for an interval of time (e.g., one week, two weeks, one month, etc.).

In some instances, this subject vehicle operation data may be received in real-time or periodically during the interval of time. In other instances, the subject vehicle operation data may be received all at once, after the interval of time is complete. The subject vehicle operation data may be received as part of a request, for example, an insurance quote request initiated by the subject vehicle user. In some embodiments, the request may include additional data, such as vehicle characteristics of the subject vehicle.

Modelling module 212 may apply risk models 226 for that geographic area to the subject vehicle operation data to generate or output a driving behavior score (and/or other evaluation) for the subject vehicle. In some embodiments, modelling module 212 may apply risk models 226 to additional data to generate the driving behavior score, such as the vehicle characteristics 224. As another example, modelling module 212 may retrieve (or otherwise access) environmental data 222 for the interval of time and may further apply risk models 226 thereto.

Based upon the driving behavior score, data analytics computing device 110 (e.g., modelling module 212) may determine whether to insure the subject vehicle 102 (and/or the subject vehicle user). Modelling module 212 may, in some embodiments, further determine one or more parameters of an insurance policy to offer the subject vehicle user, such as a coverage level, a premium, a deductible, and/or any other associated parameter. Data analytics computing device 110 may transmit a response including the score (and/or any other evaluations), the insurance quote offer, and/or any other related data back to the subject vehicle user (e.g., via app module 214 and/or communication interface 206).

Additionally or alternatively, data analytics computing device 110 may provide the driving behavior score (and/or any other outputs form risk models 226) to another party to make such determination. In some such instances, data analytics computing device 110 may also provide a recommendation to the other party based upon the driving behavior score.

Likewise, as described above, data analytics computing device 110 may perform the same or similar analyses for existing policyholders. Based upon the driving behavior score, data analytics computing device 110 (e.g., modelling module 212) may determine whether and/or how to adjust one or more parameters of an existing insurance policy (e.g., reducing a premium, offering a credit or reward, increasing a discount, etc.).

In some exemplary embodiments, data analytics computing device 110 may be further configured to perform any of the above calculations, determinations, and/or analyses in real-time. More particularly, data analytics computing device 110 may receive real-time telematics/geolocation data 220 (and/or any other vehicle operation data) associated with any number of vehicles 102 within the geographic area. The real-time data represents real-time operation of vehicles 102 within the geographic area, and may be received within seconds or minutes of being generated at the vehicle 102 and/or computing device from which the real-time data is received.

Using the real-time vehicle operation data, data analytics computing device 110 (e.g., AI/DL module 210) may determine real-time driving behavior within the geographic area. In the exemplary embodiment, AI/DL module 210 uses the same processes described above with respect to determining the standard driving behavior, to determine the real-time driving behavior. In some embodiments, the real-time driving behavior includes separate data, similar to the standard driving behavior, such as representations of speed, acceleration, braking, cornering, and the like, at locations (e.g., coordinates) within the geographic area. In other embodiments, the real-time driving behavior is represented as variations of or deviations from the standard driving behavior at those locations, which may require reduced data storage requirements.

Data analytics computing device 110 (e.g., modelling module 212) may generate a real-time driving behavior map representative of the real-time driving behavior within the geographic area. As described above, the real-time driving behavior may be represented as a comparison to the standard driving behavior for the geographic area. It should be understood that the real-time driving behavior map may or may not be displayed; that is, the map may be a theoretical "map," where location coordinates within the geographic area are associated with values or strings representing standard driving behavior, real-time driving behavior, localized environmental data, etc. Additionally or alternatively, the map may displayed on a graphical user interface to one or more users, such as vehicle users and/or users associated with an insurance company, etc. Where the map is displayed, any indicators (e.g., representing real-time variations from standard driving behavior) may be represented as icons, text, shading or variation in color (e.g., as part of a "heat map"), and/or in any other manner.

Modelling module 212 may use the real-time driving behavior to dynamically update risk models 226. This dynamic updating may improve real-time risk modelling, and enable more granular, precise, and user-specific evaluation of risk and driving behavior.

AI/DL module 210 and/or modelling module 212 may identify one or more specific locations (e.g., coordinates, ranges of coordinates, points of interest, intersections, streets, etc.) that are experiencing non-standard real-time driving behavior. Where that non-standard real-time driving behavior represents higher-risk driving behavior, data analytics computing device 110 (e.g., app module 214) may generate an alert that includes the identified location(s) and, in some embodiments, an indication of the non-standard driving behavior (e.g., harder braking, significantly lower speeds, etc.).

In some embodiments, the non-standard driving behavior may be some threshold deviation from the standard driving behavior in order for data analytics computing device 110 to generate the alert. The threshold deviation may be an absolute value deviation, a percentage deviation, or any other defined deviation that represents a significant change between the standard driving behavior and the real-time driving behavior in a location. In some embodiments, where the standard driving behavior accounts for environmental variations (e.g., between sunny days and rainy days), the threshold deviation may also account for such variations.

Data analytics computing device 110 may transmit (e.g., via app module 214 and/or communication interface 206) the alert to one or more vehicle computing devices (e.g., in-vehicle computing devices 104, user computing devices 108, etc.). Data analytics computing device 110 (e.g., modelling module 212) may determine which vehicles are within a distance range of the identified location, which vehicles are associated with a route that includes the identified location, and/or which vehicles are within the geographic area, to determine which computing devices to which to transmit the alert.

Additionally or alternatively, data analytics computing device 110 may generate and transmit instructions to re-route along an alternate route to avoid the identified location. In such embodiments, modelling module 212 analyzes the real-time driving behavior map to identify one or more alternate routes that (i) enable a vehicle 102 to avoid the identified location(s), and (ii) are not experiencing non-standard driving behavior or are experiencing non-standard driving behavior of a lower magnitude or significance. Where modelling module 212 identifies a plurality of available alternate routes, data analytics computing device 110 may be configured to generate and transmit a corresponding plurality of instruction messages, or a set of instruction messages. Each instruction message includes respective instructions to re-route along one alternate route of the plurality of alternate routes. Data analytics computing device 110 may transmit different instruction messages of the set of instruction messages to different vehicle computing devices. In this way, no single alternate route receives all of the re-routed traffic. Data analytics computing device 110 may transmit the different instruction messages randomly (e.g., based upon output from a random number generator), in series (e.g., Route 1 to vehicle A, Route 2 to vehicle B, Route 3 to vehicle C, Route 1 to vehicle D, Route 2 to vehicle E, etc.), or according to capacity of the alternate route (e.g., a single-lane country road vs. a two-lane street through town).

In some embodiments, data analytics computing device 110 may be configured to leverage the standard and/or real-time driving behavior to otherwise advise or instruct users' individual driving behavior. For example, data analytics computing device 110 may provide recommendations or instructions for a trip, to reduce risk associated with taking that trip. In particular, data analytics computing device 110 may receive a trip definition for a future trip that will be undertaken by a vehicle user.

The trip definition may include a start location, an end location, and an anticipated trip date. Data analytics computing device 110 (e.g., AI/DL module 210 and/or modelling module 212) may identify, based upon at least one of the standard driving behavior or risk models 226, a recommended start time for the future trip. For instance, AI/DL module 210 and/or modelling module 212 may execute a plurality of simulations of the future trip with varying start times, and may rank the simulations based upon an overall level of risk, based upon the respective start time. The recommended start time may be associated with the simulation associated with the lowest overall level of risk.

Additionally or alternatively, AI/DL module 210 and/or modelling module 212 may identify, from the plurality of executed simulations, at least one recommended break time and/or location. For example, the plurality of simulations may reveal that a user is likely to encounter one or more high-risk locations regardless of a start time, but that if the user takes a half-hour break at an intermediate location, the high-risk location(s) are avoided (e.g., the rush hour is over). Data analytics computing device 110 may transmit the at least one recommended break time and/or location to the vehicle user's computing device.

In some embodiments, data analytics computing device 110 (e.g., AI/DL module 210 and/or modelling module 212) may leverage real-time driving behavior to modify the recommended start time and/or break time/location. For instance, real-time driving behavior may reveal an accident along the route that could not have been predicted by the standard driving behavior. AI/DL module 210 and/or modelling module 212) may determine an alternate route, an alternate start time, and/or an alternate break time/location that would enable the vehicle user to avoid that location, and data analytics computing device 110 may transmit any of these data to the vehicle user in a notification or alert message.

Module 214 is configured to facilitate maintaining data management app 120 and providing the functionality thereof to users. Module 214 may store instructions that enable the download and/or execution of data management app 120 at user computing devices 108. Module 214 may store instructions regarding user interfaces, controls, commands, settings, and the like, and may format data into a format suitable for transmitting to user computing devices 108 for display thereat.

In the exemplary embodiment, processor 202 is operatively coupled to communication interface 206 such that data analytics computing device 110 is capable of communicating with remote device(s) such as vehicles 102, user computing devices 108, third party devices 112, and/or insurance servers 114 (all shown in FIG. 1) over a wired or wireless connection. For example, communication interface 206 may receive geolocation, telematics, sensor, and/or environmental data from user computing devices 108, vehicles 102, and/or third-party devices 112. Communication interface 206 may include, for example, a wired or wireless network adapter and/or a wireless data transceiver for use with a mobile telecommunications network.

Processor 202 may also be operatively coupled to database 116 (and/or any other storage device) via storage interface 208. Database 116 may be any computer-operated hardware suitable for storing and/or retrieving data. In some embodiments, database 116 may be integrated in data analytics computing device 110. For example data analytics computing device 110 may include one or more hard disk drives as database 116.

In other embodiments, database 116 is external to data analytics computing device 110 and is accessed by a plurality of computer devices. For example, database 116 may include a storage area network (SAN), a network attached storage (NAS) system, multiple storage units such as hard disks and/or solid state disks in a redundant array of inexpensive disks (RAID) configuration, cloud storage devices, and/or any other suitable storage device.

Storage interface 208 may be any component capable of providing processor 202 with access to database 116. Storage interface 208 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 202 with access to database 116.

Processor 202 may execute computer-executable instructions for implementing aspects of the disclosure. In some embodiments, processor 202 may be transformed into a special purpose microprocessor by executing computer-executable instructions or by otherwise being programmed. For example, processor 202 may be programmed with the instructions such as those illustrated in FIG. 7.

Memory 204 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Exemplary Data Management App

In the exemplary embodiment, data analytics computing device 110 may also maintain data management software application or "app" 120 that enables users to initiate requests to transmit to data analytics computing device 110 (e.g., insurance quote requests, policy update requests, trip recommendation requests, etc.) and view messages from data analytics computing device 110 (e.g., insurance quote responses or offers, policy updates, rewards, alerts, notifications, recommendations, etc.). Data management app 120 may also enable users to change their preferences regarding data-sharing to/from data analytics computing device 110 (e.g., Data management app 120 may be executed on user computing devices 108 and/or in-vehicle computing devices 104, as described elsewhere herein.

In one embodiment, data management app 120 may enable a user to view telematics data, geolocation data, other sensor data, environmental data, and/or image data collected by their vehicle 102 and/or user computing device 108 that is transmitted to data analytics computing device 110. Data management app 120 may further enable the vehicle user to adjust one or more settings, such as user preferences associated with what data is transmitted and/or how often data is transmitted, whether/when to share data, which vehicles 102 to share data for, whether/how to receive alerts/notifications/ etc., add/update vehicles 102 and/or vehicle characteristics associated with such data sharing, and the like. Data management app 120 may also enable a user to sync profiles or data transmission with other services or apps on their device(s), such as ride-sharing apps, vehicle-rental apps, and the like.

Figure 3:
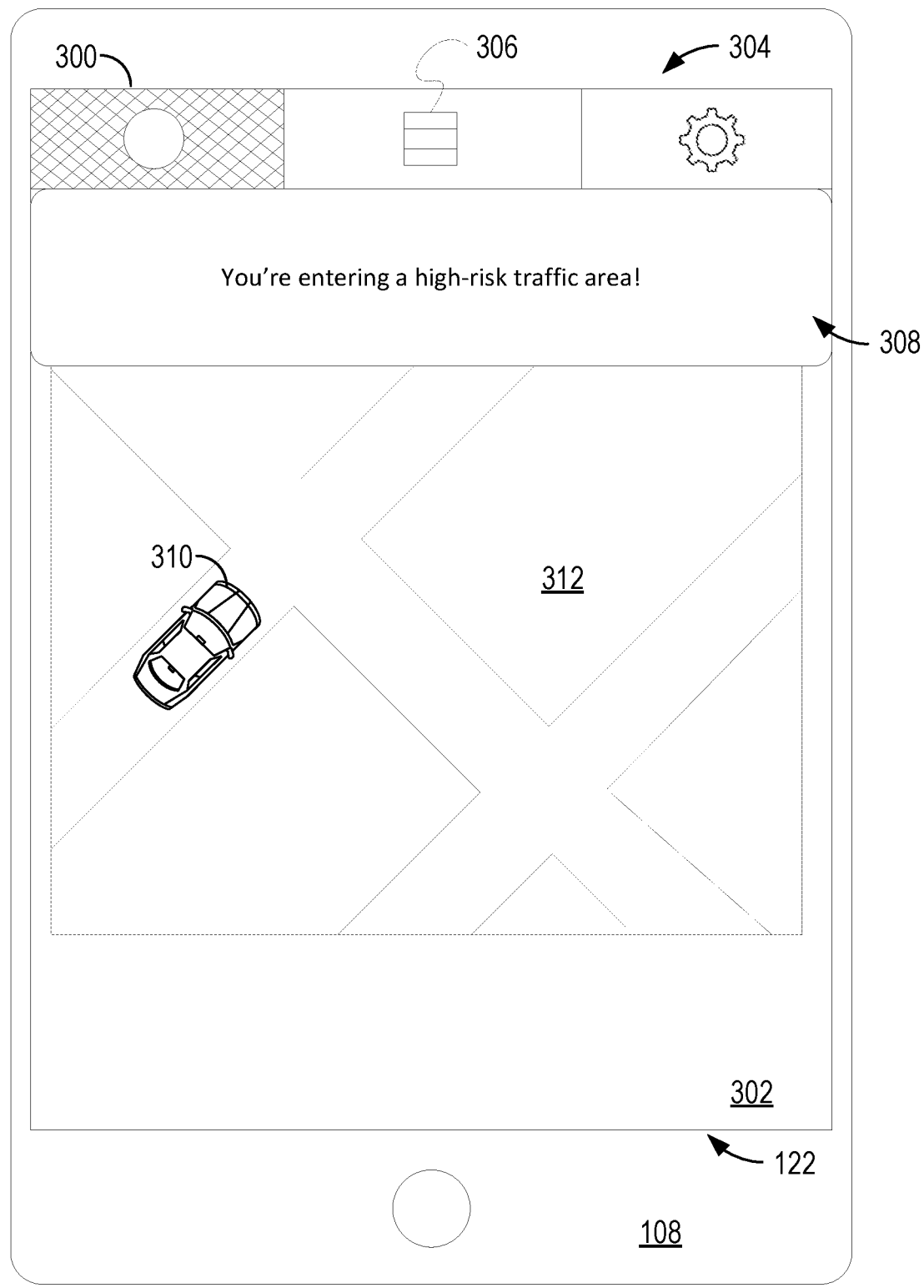
FIG. 3-5 depict exemplary screen captures of a data management software application ("app") maintained using the computer system shown in FIG. 1.
Figure 4:
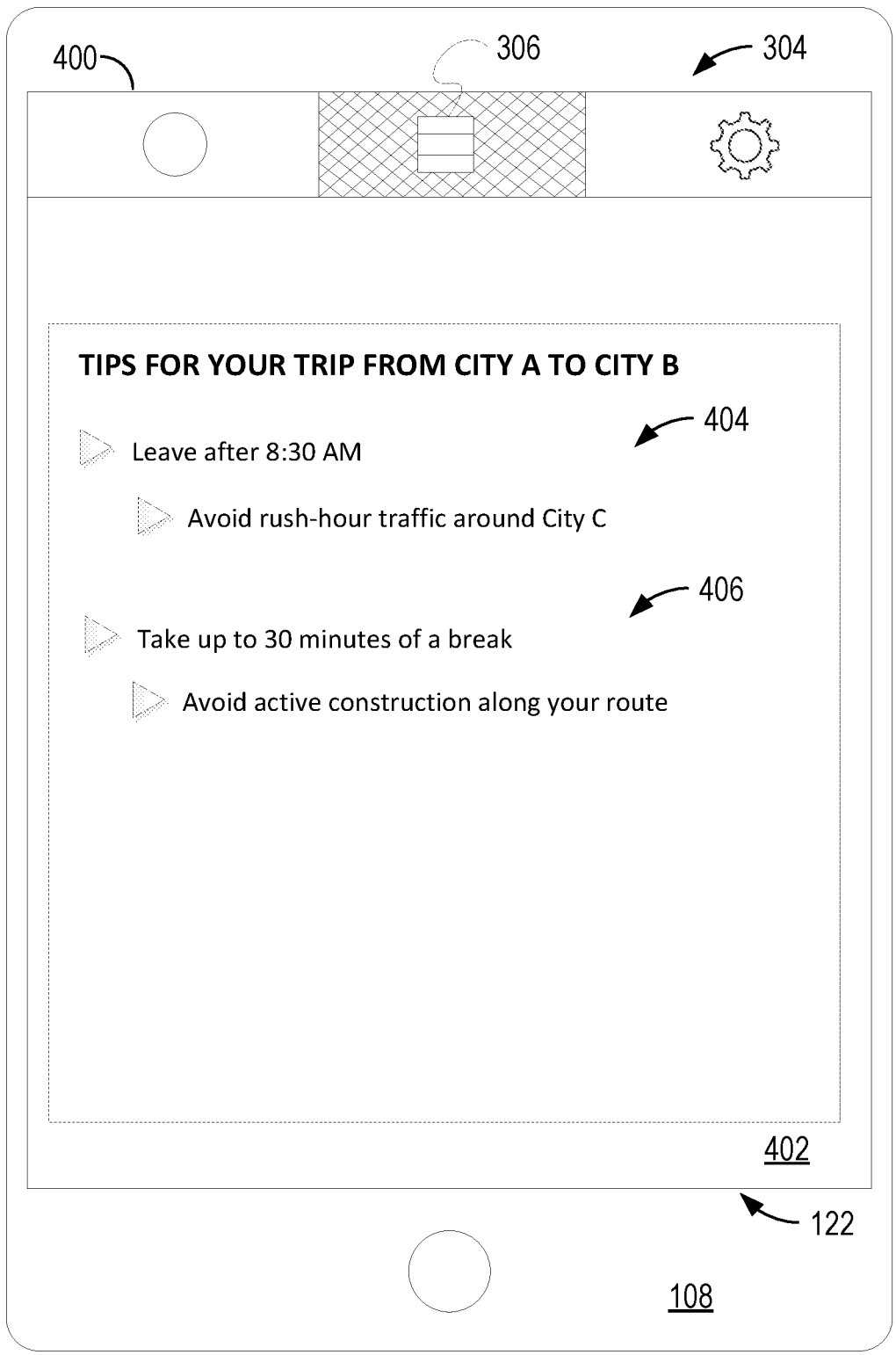
Figure 5:
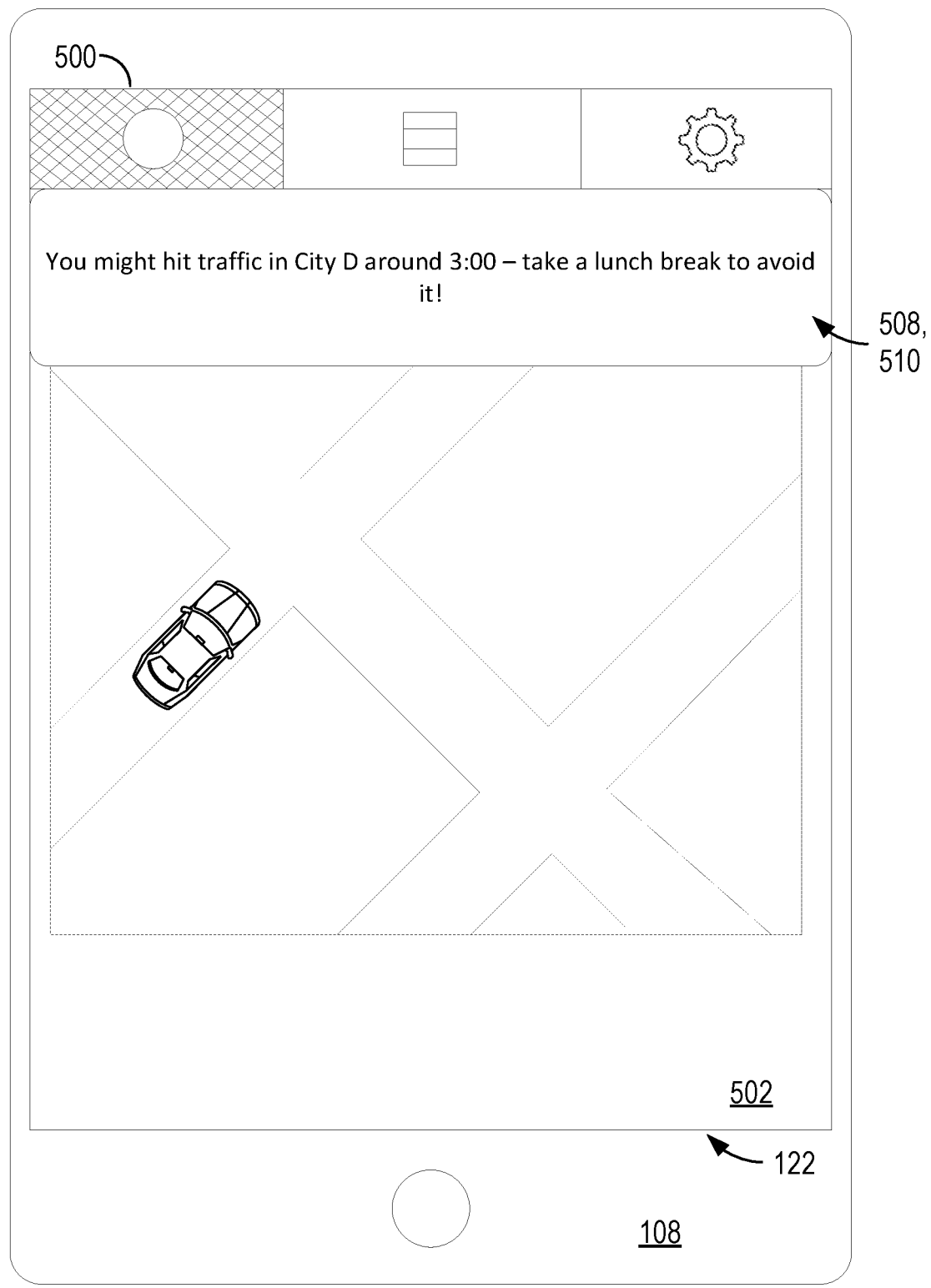

FIGS. 3-5 depict exemplary screen captures or "screenshots" of user interface 122 of data management app 120 as executed on a user computing device 108 (all shown in FIG. 1). The exemplary screenshots include various features and functionalities of data management app 120. In particular, data analytics computing device 110 causes to be displayed at least user offerings at user computing device 108, specifically via data management app 120.

More specifically, FIG. 3 depicts a screenshot 300 of a first page 302 accessed by a user within user interface 122 of data management app 120. First page 302 may display a menu 304 of icons 306 that may be selected by the user to access different sections, pages, and/or functionality of data management app 120. In the illustrated embodiment, menu 304 includes icons 306 associated with Motion (represented as a circle), Trip Planning (represented as a lined box), and Settings (represented as a gear). It should be readily understood that menu 304 may include additional, fewer, and/or alternative icons 306 that may represent additional, fewer, and/or alternative sections, pages, and/or functionality within data management app 120.

In the illustrated embodiment, the user has selected the icon 306 associated with the Motion section to display first page 302. First page 302 displays a current location of user computing device 108 as an icon 310 of their vehicle on a map 312. Also shown is an alert 308, embodied as a pop-up or push notification overlaid on map 312. In this example, alert 308 indicates that the user is entering a high-risk traffic area, or an area experiencing non-standard real-time driving behavior, as described elsewhere herein. Alert 308 may, in some embodiments, further include a description or indication of how the risk in this location is higher, such as increased hard braking or hard cornering events, significantly reduced speeds, etc.

FIG. 4 depicts a screenshot 400 of a second page 402 accessed by a user within user interface 122 of data management app 120. In the illustrated embodiment, the user has selected the icon 306 associated with the Trip Planning section to display second page 402. User interface 122 displays details of a previously entered future trip, include a start location (CITY A) and an end location (CITY B). User interface 122 further displays a recommended start time 404 (8:30 AM) from data analytics computing device 110. Recommended start time 404 may include details of why that particular start time is recommended ("avoid rush hour around City C", where City C is an intermediate location between City A and City B). User interface 122 further displays a recommended break time 406 ("up to 30 minutes") determined by data analytics computing device 110. Recommended break time 406 may include details of why that particular break time is recommended ("avoid active construction"). Recommended break time 406 may further include a recommended break location.

FIG. 5 depicts a screenshot 500 of a third page 502 accessed by a user within user interface 122 of data management app 120. In the illustrated embodiment, the user has selected the icon 306 associated with the Motion section to display third page 502. Third page 502, similar to first page 302, displays the current location of user computing device 108 as icon 310 of their vehicle on map 312. Also shown is an alert 508, embodied as a pop-up or push notification overlaid on map 312. In this example, alert 508 is associated with a trip (e.g., the trip identified on second page 402) that the user of user computing device 108 is undertaking. Alert 508 indicates that the user may encounter an area experiencing non-standard real-time driving behavior, as described elsewhere herein, and therefore includes a recommended break time/location 510 corresponds to the user's current location.

Exemplary User Computer Device

Figure 6:
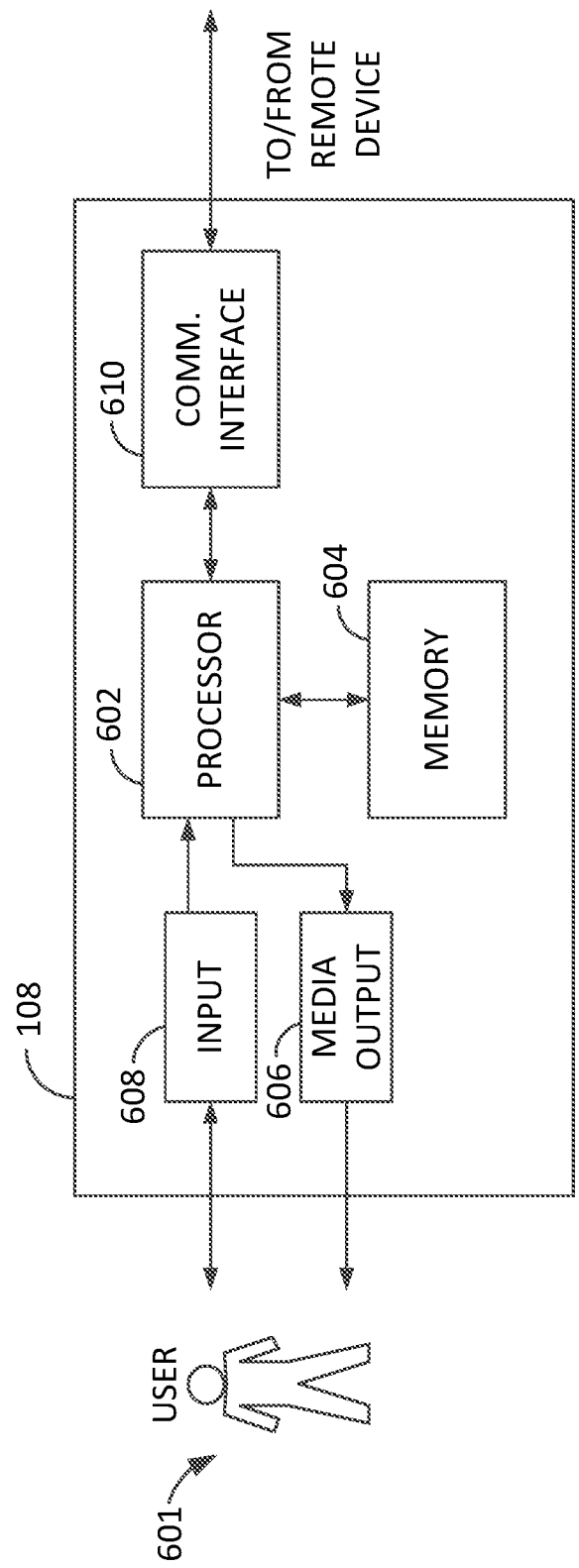
FIG. 6 illustrates a schematic diagram of an exemplary user computing device that may be used in the computer system shown in FIG. 1.

FIG. 6 depicts an exemplary configuration of an exemplary user computer device 108 that may be used with computer system 100 (shown in FIG. 1), in accordance with one embodiment of the present disclosure. User computer device 108 may be operated by a user 601.

User computer device 108 may include a processor 602 for executing instructions. In some embodiments, executable instructions may be stored in a memory area 604. Processor 602 may include one or more processing units (e.g., in a multi-core configuration). Memory area 604 may be any device allowing information such as executable instructions and/or transaction data to be stored and retrieved. Memory area 604 may include one or more computer-readable media. Memory area 604 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

User computer device 108 also may include at least one media output component 606 for presenting information to user 601, such as user interface 122 of data management app 120 (both shown in FIG. 1) when data management app 120 is executed on user computing device 108. Media output component 606 may be any component capable of conveying information to user 601. In some embodiments, media output component 606 may include an output adapter (not shown), such as a video adapter and/or an audio adapter. An output adapter may be operatively coupled to processor 602 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

In some embodiments, user computer device 108 may include an input device 608 for receiving input from user 601. User 601 may use input device 608 to, without limitation, interact with data analytics computing device 110 (shown in FIG. 1), view alerts/notifications/offers, and the like. Input device 608 may include, for example, a keyboard, a pointing device, a mouse, a stylus, and/or a touch sensitive panel (e.g., a touch pad or a touch screen). A single component such as a touch screen may function as both an output device of media output component 606 and input device 608.

User computer device 108 may also include a communication interface 610, communicatively coupled to a remote device such as data analytics computing device 110. Communication interface 610 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 604 may be, for example, computer-readable instructions for providing a user interface to user 601 via media output component 606 and, optionally, receiving and processing input from input device 608. The user interface may include, among other possibilities, a web browser and/or a client application. Web browsers enable users, such as user 601, to display and interact with media and other information typically embedded on a web page or a website from data analytics computing device 110. A client application (e.g., data management app 120) may allow user 601 to interact with, for example, data analytics computing device 110. For example, instructions may be stored by a cloud service and the output of the execution of the instructions sent to the media output component 606.

Figure 7:
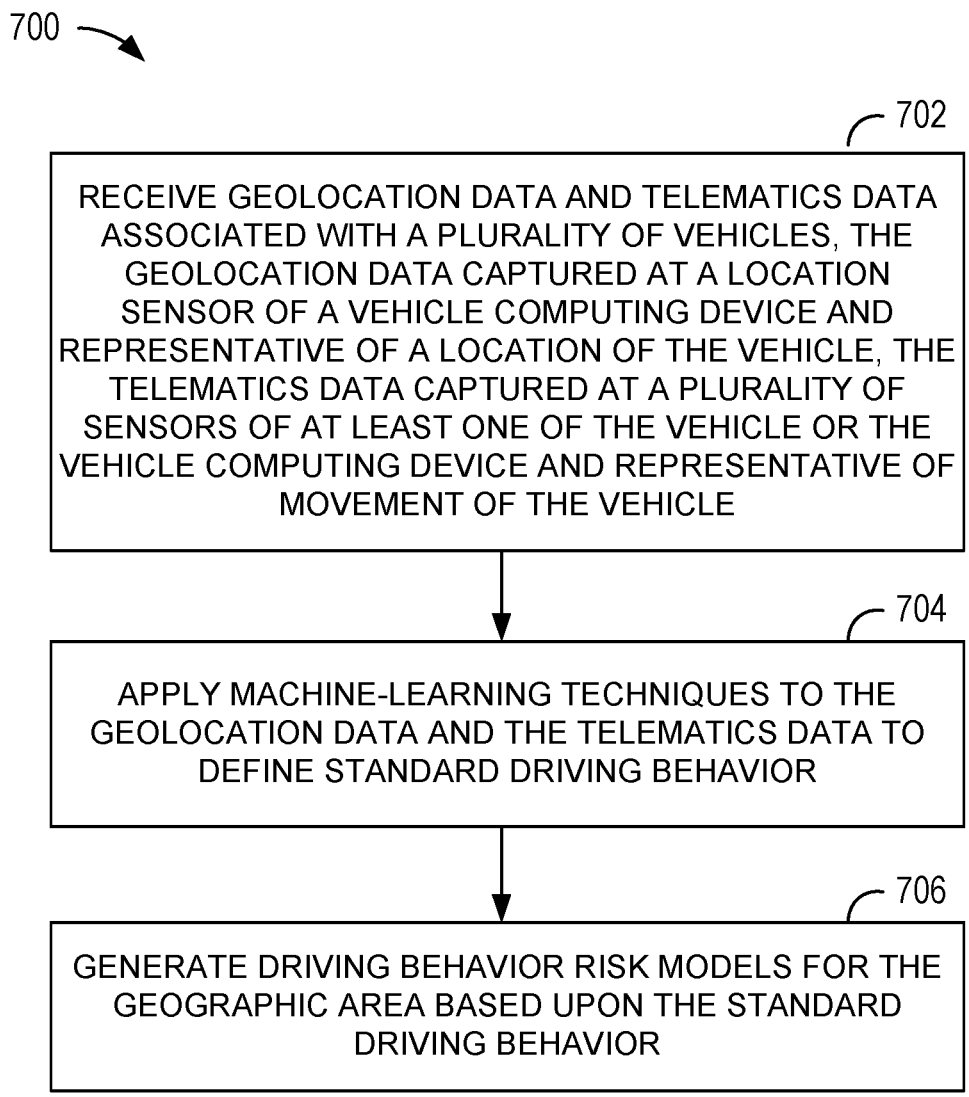
FIG. 7 illustrates a flow chart of an exemplary computer-implemented method for generating refined risk models responsive to vehicle-based telematics data, using the computer system shown in FIG. 1.

Exemplary Computer-Implemented Method for Generating Refined Risk Models Responsive to Vehicle-Based Telematics Data FIG. 7 depicts a flow chart of an exemplary computer-implemented method 600 for generating refined risk models responsive to vehicle-based telematics data, using computer system 100 shown in FIG. 1. In the exemplary embodiment, method 600 may be performed by data analytics computing device 110 (shown in FIG. 1).

Method 700 may include receiving 702 geolocation data and telematics data associated with a plurality of vehicles (e.g., vehicles 102, also shown in FIG. 1). The geolocation data may be captured at a location sensor of a vehicle computing device and representative of a location of the vehicle, and the telematics data may be captured at a plurality of sensors of at least one of the vehicle or the vehicle computing device and representative of movement of the vehicle. The plurality of vehicles may be associated with (e.g., travelling in, insured in, registered in, etc.) a geographic area. In some embodiments, the telematics data may include at least one of speed, acceleration, cornering, or braking data captured by respective sensors of the at least one of the vehicle or the vehicle computing device.

Method 700 may also include applying 704 machine-learning techniques to the geolocation data and the telematics data to define standard driving behavior within the geographic area, and generating 706 driving behavior risk models for the geographic area based upon the standard driving behavior. In some embodiments, the standard driving behavior may include at least one of a standard speed, acceleration, cornering, or braking within the geographic area.

Method 700 may include additional, fewer, and/or alternative steps, including those described herein. For example, in some embodiments, receiving 702 may include receiving 702 the geolocation data and the telematics data from at least one of the plurality of vehicles or a respective plurality of vehicle computing devices. In other embodiments, receiving 702 may include storing the geolocation data and the telematics data in a memory device (e.g., database 116, shown in FIG. 1), indexed according to the geographic area, and/or retrieving the geolocation data and the telematics data from the memory device by performing a lookup operation in the memory device using an identifier of the geographic area.

In some embodiments, method 700 may further include receiving vehicle characteristics associated with each vehicle of the plurality of vehicles, the vehicle characteristics including at least one of a respective vehicle make, vehicle model, vehicle age, or vehicle type of each vehicle, and/or applying 704 machine-learning techniques to the geolocation data, the telematics data, and the vehicle characteristics to further define standard driving behavior for each of a plurality of vehicle types within the geographic area.

In some embodiments, method 700 may include receiving environmental data for the geographic area, and/or applying 704 machine-learning techniques to the geolocation data, the telematics data, and the environmental data to further define standard driving behavior within the geographic area. In some such embodiments, the environmental data may include at least one of traffic data, accident data, insurance claim data, time, date, weather data, or season data.

In some embodiments, method 700 may include: (i) receiving image data associated with the geographic area, the image data including images of road infrastructure of the geographic area; (ii) applying 704 machine-learning techniques to the image data to define an infrastructure complexity score for the geographic area; and/or (iii) further generating 706 the driving behavior risk models based upon the infrastructure complexity score. In some such embodiments, receiving the image data includes receiving the image data from at least one of: (i) a satellite image data source, (ii) a geospatial image data source, or (iii) at least one vehicle of the plurality of vehicles. Further, method 700 may include transmitting the infrastructure complexity score to a receiving party computing device.

In some embodiments, method 700 may include: (i) receiving subject telematics data and subject geolocation data for an interval of time for a subject vehicle within the geographic area; (ii) applying 704 the driving behavior risk models to the subject telematics data and subject geolocation data to generate a driving behavior score for the subject vehicle; and/or (iii) determining whether to insure the subject vehicle based upon the driving behavior score.

In some embodiments, method 700 may include receiving real-time telematics data and geolocation data associated with at least a portion of the plurality of vehicles within the geographic area, and/or generating a real-time driving behavior map representative of real-time driving behavior within the geographic area. In some such embodiments, method 700 may further include identifying at least one location within the geographic area experiencing non-standard driving behavior, and/or transmitting an alert to one or more vehicle computing devices, the alert including the identified location and the non-standard driving behavior. Method 700 may include identifying at least one location within the geographic area experiencing non-standard driving behavior, and/or transmitting instructions to one or more vehicle computing devices to re-route along an alternate route to avoid the identified location. In some such embodiments, method 700 may further include: (i) identifying a plurality of alternate routes to avoid the identified location; (ii) generating a set of instruction messages, each instruction message including respective instructions to re-route along one alternate route of the plurality of alternate routes; and/or (iii) transmitting one of the set of instruction messages to each one or more vehicle computing devices. In some such embodiments, method 700 may additionally include transmitting the one of the set of instruction messages to each one or more vehicle computing devices based upon output from a random number generator. Additionally or alternatively, method 700 may include dynamically updating the driving behavior risk models based upon the real-time driving behavior within the geographic area.

In some embodiments, method 700 may include: (i) receiving a trip definition for a future trip, the trip definition including a start location, an end location, and an anticipated trip date, wherein at least one of the start location or the end location are in the geographic area; (ii) identifying, based upon at least one of the standard driving behavior or the driving behavior risk models, a recommended start time for the future trip; and/or (iii) transmitting the recommended start time to a computing device of an individual associated with the future trip. In some such embodiments, method 700 may further include identifying, based upon the recommended start time and at least one of the standard driving behavior or the driving behavior risk models, at least one recommended break time and location for the future trip, and/or transmitting the recommended break time and location to the computing device of the individual associated with the future trip. Method 700 may include additional, less, or alternative actions, including those discussed elsewhere.

EXEMPLARY EMBODIMENTS & FUNCTIONALITY

In one exemplary aspect, a data analytics computing device for generating refined risk models responsive to vehicle-based telematics data (and/or computer-executable instructions stored on a non-transitory storage media and readable by the computing device to perform the functions described herein) may be provided. The data analytics computing device may include at least one processor and/or an associated transceiver in communication with a memory device. The at least one processor and/or associated transceiver may be programmed to: (i) receive geolocation data and telematics data associated with a plurality of vehicles, the geolocation data captured at a location sensor of a vehicle computing device and representative of a location of the vehicle, the telematics data captured at a plurality of sensors of at least one of the vehicle or the vehicle computing device and representative of movement of the vehicle, the plurality of vehicles associated with a geographic area; (ii) apply machine-learning techniques to the geolocation data and the telematics data to define standard driving behavior within the geographic area; and/or (iii) generate driving behavior risk models for the geographic area based upon the standard driving behavior One enhancement may be, wherein the telematics data include at least one of speed, acceleration, cornering, or braking data captured by respective sensors of the at least one of the vehicle or the vehicle computing device. In some embodiments, the standard driving behavior may include at least one of a standard speed, acceleration, cornering, or braking within the geographic area.

Another enhancement may be, wherein to receive the geolocation data and the telematics data, the at least one processor and/or associated transceiver is further programmed to receive the geolocation data and the telematics data from at least one of the plurality of vehicles or a respective plurality of vehicle computing devices.

A further enhancement may be, wherein to receive the geolocation data and the telematics data, the at least one processor and/or associated transceiver is further programmed to: (a) store the geolocation data and the telematics data in the memory device, indexed according to the geographic area; and/or (b) retrieve the geolocation data and the telematics data from the memory device by performing a lookup operation in the memory device using an identifier of the geographic area.

One enhancement may be, wherein the at least one processor and/or associated transceiver is further programmed to: (a) receive vehicle characteristics associated with each vehicle of the plurality of vehicles, the vehicle characteristics including at least one of a respective vehicle make, vehicle model, vehicle age, or vehicle type of each vehicle; and/or (b) apply machine-learning techniques to the geolocation data, the telematics data, and the vehicle characteristics to further define standard driving behavior for each of a plurality of vehicle types within the geographic area.

A further enhancement may be, wherein the at least one processor and/or associated transceiver is further programmed to: (a) receive environmental data for the geographic area; and/or (b) apply machine-learning techniques to the geolocation data, the telematics data, and the environmental data to further define standard driving behavior within the geographic area. In some embodiments, the environmental data may include at least one of traffic data, accident data, insurance claim data, time, date, weather data, or season data.

Another enhancement may be, wherein the at least one processor and/or associated transceiver is further programmed to: (a) receive image data associated with the geographic area, the image data including images of road infrastructure of the geographic area; (b) apply machine-learning techniques to the image data to define an infrastructure complexity score for the geographic area; and/or (c) further generate the driving behavior risk models based upon the infrastructure complexity score. In some embodiments, to receive the image data, the at least one processor and/or associated transceiver may be further programmed to receive the image data from at least one of: (i) a satellite image data source, (ii) a geospatial image data source, or (iii) at least one vehicle of the plurality of vehicles. In some embodiments, the at least one processor and/or associated transceiver may be further programmed to transmit the infrastructure complexity score to a receiving party computing device.

One enhancement may be where the at least one processor and/or associated transceiver is further programmed to: (a) receive subject telematics data and subject geolocation data for an interval of time for a subject vehicle within the geographic area; (b) apply the driving behavior risk models to the subject telematics data and subject geolocation data to generate a driving behavior score for the subject vehicle; and/or (c) determine whether to insure the subject vehicle based upon the driving behavior score.

An additional enhancement may be where the at least one processor and/or associated transceiver is further programmed to: (a) receive real-time telematics data and geolocation data associated with at least a portion of the plurality of vehicles within the geographic area; and/or (b) generate a real-time driving behavior map representative of real-time driving behavior within the geographic area. In some embodiments, the at least one processor and/or associated transceiver may be further programmed to: (c) identify a location within the geographic area experiencing non-standard driving behavior; and/or (d) transmit an alert to one or more vehicle computing devices, the alert including the identified location and the non-standard driving behavior. In other embodiments, the at least one processor and/or associated transceiver may be further programmed to: (c) identify a location within the geographic area experiencing non-standard driving behavior; and/or (d) transmit instructions to one or more vehicle computing devices to re-route along an alternate route to avoid the identified location. In some such embodiments, the at least one processor and/or associated transceiver may be further programmed to: (e) identify a plurality of alternate routes to avoid the identified location; (f) generate a set of instruction messages, each instruction message including respective instructions to reroute along one alternate route of the plurality of alternate routes; and/or (g) transmit one of the set of instruction messages to each one or more vehicle computing devices. In some such embodiments, the at least one processor and/or associated transceiver may be further programmed to transmit the one of the set of instruction messages to each one or more vehicle computing devices based upon output from a random number generator. In some embodiments, the at least one processor and/or associated transceiver may be programmed to dynamically update the driving behavior risk models based upon the real-time driving behavior within the geographic area.

A further enhancement may be where the at least one processor and/or associated transceiver may be further programmed to: (a) receive a trip definition for a future trip, the trip definition including a start location, an end location, and an anticipated trip date, wherein at least one of the start location or the end location are in the geographic area; (b) identify, based upon at least one of the standard driving behavior or the driving behavior risk models, a recommended start time for the future trip; and/or (c) transmit the recommended start time to a computing device of an individual associated with the future trip. In some such embodiments, the at least one processor and/or associated transceiver may be further programmed to: (d) identify, based upon the recommended start time and at least one of the standard driving behavior or the driving behavior risk models, at least one recommended break time and location for the future trip; and/or (e) transmit the recommended break time and location to the computing device of the individual associated with the future trip.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as current/real-time and/or historical geolocation data, telematics data, traffic data, crime data, accident data, insurance claim data, weather data, event data, and the like. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract trends and/or patterns in user behavior, relative to contextual data, that may then be used to generate intelligent user offerings.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), SD card, memory device and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer-readable medium. In one exemplary embodiment, the system is executed on a single computer system, without requiring a connection to a server computer. In a further exemplary embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. The following detailed description illustrates embodiments of the disclosure by way of example and not by way of limitation. It is contemplated that the disclosure has general application to providing an on-demand ecosystem in industrial, commercial, and residential applications.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process may also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A data analytics computing device comprising at least one processor in communication with a memory device, the at least one processor programmed to:

receive geolocation data and telematics data associated with a first plurality of vehicles operated within a geographic area, the geolocation data captured at a location sensor of a vehicle computing device and representative of a location of the vehicle, the telematics data captured at a plurality of sensors of at least one of the vehicle or the vehicle computing device and representative of movement of the vehicle;

apply machine-learning techniques to the geolocation data and the telematics data to define standard driving behavior within the geographic area;

receive real-time telematics and geolocation data associated with a second plurality of vehicles operating in real-time within the geographic area;

detect, in the real-time telematics and geolocation data, a threshold deviation of real-time driving behavior from the standard behavior at a location within the geographic area;

based upon the detection, identify the location as experiencing non-standard driving behavior;

identify a plurality of alternate routes to avoid the identified location;

determine a respective alternate route of the plurality of alternate routes to which to send each respective vehicle currently within a threshold distance of the identified location, based upon one of: (i) output from a random number generator, or (ii) a determined current traffic capacity for each alternate route based upon the real-time telematics and geolocation data;

generate a set of instruction messages, each instruction message associated with a respective vehicle currently within the threshold distance of the identified location, each instruction message including an indicator of the identified location, a current location of the respective vehicle relative to the identified location, and respective instructions to re-route along the determined respective alternate route of the plurality of alternate routes; and transmit each instruction message, each instruction message causing, at a respective recipient device, display of the instructions as an overlay on a real-time driving behavior map of the geographic area.

2. The data analytics computing device of claim 1, wherein the telematics data include at least one of speed, acceleration, cornering, or braking data captured by respective sensors of the at least one of the vehicle or the vehicle computing device.

3. The data analytics computing device of claim 2, wherein the standard driving behavior includes at least one of a standard speed, acceleration, cornering, or braking within the geographic area.

4. The data analytics computing device of claim 1, wherein to receive the geolocation data and the telematics data, the at least one processor is further programmed to receive the geolocation data and the telematics data from at least one of the plurality of vehicles or a respective plurality of vehicle computing devices.

5. The data analytics computing device of claim 1, wherein to receive the geolocation data and the telematics data, the at least one processor is further programmed to:
store the geolocation data and the telematics data in the memory device, indexed according to the geographic area; and
retrieve the geolocation data and the telematics data from the memory device by performing a lookup operation in the memory device using an identifier of the geographic area.

6. The data analytics computing device of claim 1, wherein the at least one processor is further programmed to:
receive vehicle characteristics associated with each vehicle of the plurality of vehicles, the vehicle characteristics including at least one of a respective vehicle make, vehicle model, vehicle age, or vehicle type of each vehicle; and
apply machine-learning techniques to the geolocation data, the telematics data, and the vehicle characteristics to further define standard driving behavior for each of a plurality of vehicle types within the geographic area.

7. The data analytics computing device of claim 1, wherein the at least one processor is further programmed to:
receive environmental data for the geographic area; and
apply machine-learning techniques to the geolocation data, the telematics data, and the environmental data to further define standard driving behavior within the geographic area.

8. The data analytics computing device of claim 7, wherein the environmental data includes at least one of traffic data, accident data, insurance claim data, time, date, weather data, or season data.

9. The data analytics computing device of claim 1, wherein the at least one processor is further programmed to:
receive image data associated with the geographic area, the image data including images of road infrastructure of the geographic area;
apply machine-learning techniques to the image data to define an infrastructure complexity score for the geographic area; and
further generate the driving behavior risk models based upon the infrastructure complexity score.

10. The data analytics computing device of claim 9, wherein to receive the image data, the at least one processor is further programmed to receive the image data from at least one of: (i) a satellite image data source, (ii) a geospatial image data source, or (iii) at least one vehicle of the plurality of vehicles.

11. The data analytics computing device of claim 9, wherein the at least one processor is further programmed to transmit the infrastructure complexity score to a receiving party computing device.

12. The data analytics computing device of claim 1, wherein the at least one processor is further programmed to:
receive subject telematics data and subject geolocation data for an interval of time for a subject vehicle within the geographic area;
apply the driving behavior risk models to the subject telematics data and subject geolocation data to generate a driving behavior score for the subject vehicle; and
determine whether to insure the subject vehicle based upon the driving behavior score.

13. The data analytics computing device of claim 1, wherein the at least one processor is further programmed to:
transmit an alert to one or more additional vehicle computing devices within or near the identified location, the alert including an indicator of the identified location and a visual representation of the non-standard driving behavior.

14. The data analytics computing device of claim 1, wherein the at least one processor is further programmed to dynamically update the driving behavior risk models based upon the real-time driving behavior within the geographic area.

15. The data analytics computing device of claim 1, wherein the at least one processor is further programmed to:
receive a trip definition for a future trip, the trip definition including a start location, an end location, and an anticipated trip date, wherein at least one of the start location or the end location are in the geographic area;
identify, based upon at least one of the standard driving behavior or the driving behavior risk models, a recommended start time for the future trip; and
transmit the recommended start time to a computing device of an individual associated with the future trip.

16. The data analytics computing device of claim 15, wherein the at least one processor is further programmed to:
identify, based upon the recommended start time and at least one of the standard driving behavior or the driving behavior risk models, at least one recommended break time and location for the future trip; and
transmit the recommended break time and location to the computing device of the individual associated with the future trip.

17. A computer-implemented method comprising, via a data analytics computing device comprising at least one processor in communication with a memory device:
receiving geolocation data and telematics data associated with a first plurality of vehicles operated within a geographic area, the geolocation data captured at a location sensor of a vehicle computing device and representative of a location of the vehicle, the telematics data captured at a plurality of sensors of at least one of the vehicle or the vehicle computing device and representative of movement of the vehicle;
applying machine-learning techniques to the geolocation data and the telematics data to define standard driving behavior within the geographic area;
receiving real-time telematics and geolocation data associated with a second plurality of vehicles operating in real-time within the geographic area;
detecting, in the real-time telematics and geolocation data, a threshold deviation of real-time driving behavior from the standard behavior at a location within the geographic area;
based upon said detecting, identifying the location as experiencing non-standard driving behavior;
identifying a plurality of alternate routes to avoid the identified location;
determining a respective alternate route of the plurality of alternate routes to which to send each respective vehicle currently within a threshold distance of the identified location, based upon one of: (i) output from a random number generator, or (ii) a determined current traffic capacity for each alternate route based upon the real-time telematics and geolocation data;

generating a set of instruction messages, each instruction message associated with a respective vehicle currently within the threshold distance of the identified location, each instruction message including an indicator of the identified location, a current location of the respective vehicle relative to the identified location, and respective instructions to re-route along the determined respective alternate route of the plurality of alternate routes; and transmitting each instruction message, each instruction message causing, at a respective recipient device, display of the instructions as an overlay on a real-time driving behavior map of the geographic area.

\* \* \* \* \*